US010507402B2

(12) United States Patent
Rock

(10) Patent No.: US 10,507,402 B2
(45) Date of Patent: Dec. 17, 2019

(54) SYSTEM FOR LIQUID PURIFICATION

(71) Applicant: MICRONIC TECHNOLOGIES, INC., Sterling, VA (US)

(72) Inventor: Kelly P. Rock, Abingdon, VA (US)

(73) Assignee: MICRONIC TECHNOLOGIES, INC., Bristol, VA (US)

( * ) Notice: Subject to any disclaimer, the term of this patent is extended or adjusted under 35 U.S.C. 154(b) by 83 days.

(21) Appl. No.: 15/502,066

(22) PCT Filed: Aug. 7, 2015

(86) PCT No.: PCT/US2015/044153
§ 371 (c)(1),
(2) Date: Feb. 6, 2017

(87) PCT Pub. No.: WO2016/022888
PCT Pub. Date: Feb. 11, 2016

(65) Prior Publication Data
US 2017/0225096 A1 Aug. 10, 2017

Related U.S. Application Data

(60) Provisional application No. 62/034,638, filed on Aug. 7, 2014.

(51) Int. Cl.
*B01D 1/14* (2006.01)
*B01D 1/28* (2006.01)
(Continued)

(52) U.S. Cl.
CPC .............. *B01D 1/14* (2013.01); *B01D 1/2856* (2013.01); *B01D 5/006* (2013.01); *B01D 5/0075* (2013.01);
(Continued)

(58) Field of Classification Search
CPC ........ B01D 1/14; B01D 1/2856; B01D 5/006; B01D 5/0075; B01D 45/16;
(Continued)

(56) References Cited

U.S. PATENT DOCUMENTS 5,553,460 A * 9/1996 Isaacs .................... B01D 45/16
62/129
7,832,714 B2 11/2010 Duesel
(Continued)

OTHER PUBLICATIONS

International Search Report dated Nov. 4, 2015 for Appln. No. PCT/US2015/044153.
(Continued)

*Primary Examiner* — Youngsul Jeong
*Assistant Examiner* — Gabriel E Gitman
(74) *Attorney, Agent, or Firm* — Pillsbury Winthrop Shaw Pittman, LLP

(57) ABSTRACT

An apparatus includes an atomizer with a first flow member defining a first flow path and a second flow member defining a second flow path such that a solution and an inlet gas can flow in the first and second flow path to a mixing volume defined by the first flow member. A vane of the second flow member redirects a portion of at least one of a tangential velocity component or a circumferential velocity component of the flow to produce a rotational velocity component therein. The solution and the inlet gas mix within the mixing volume to produce a mixture. A separator is fluidically coupled to the second flow member to receive the mixture. The separator produces a first flow including a vaporized portion of a solvent from the solution and a second flow including a liquid portion of the solvent and a solute from the solution.

17 Claims, 23 Drawing Sheets

(51) Int. Cl.
    *C02F 1/04*     (2006.01)
    *B01D 5/00*     (2006.01)
    *B05B 7/00*     (2006.01)
    *C02F 1/12*     (2006.01)
    *B04C 3/00*     (2006.01)
    *C02F 101/16*     (2006.01)
    *C02F 101/32*     (2006.01)
    *C02F 101/34*     (2006.01)
    *C02F 101/38*     (2006.01)
    *C02F 103/00*     (2006.01)
    *C02F 103/10*     (2006.01)

(52) U.S. Cl.
    CPC ............... B05B 7/00 (2013.01); C02F 1/041 (2013.01); C02F 1/12 (2013.01); *B04C 2003/006* (2013.01); *C02F 2101/16* (2013.01); *C02F 2101/32* (2013.01); *C02F 2101/34* (2013.01); *C02F 2101/38* (2013.01); *C02F 2103/007* (2013.01); *C02F 2103/10* (2013.01)

(58) Field of Classification Search
    CPC ........ B01D 19/0052; C02F 1/041; C02F 1/12; C02F 2103/007; C02F 2103/10; C02F 2101/16; C02F 2101/32; C02F 2101/34; C02F 2101/38; B05B 7/00; B04C 2003/006

See application file for complete search history.

(56) References Cited

U.S. PATENT DOCUMENTS

| | | | | |
|---|---|---|---|---|
| 8,496,786 | B2* | 7/2013 | Larson | C10G 9/40 196/110 |
| 9,039,819 | B2* | 5/2015 | Rock | B01D 1/14 96/208 |
| 9,044,692 | B2* | 6/2015 | Rock | B01D 1/14 |
| 2008/0251419 | A1* | 10/2008 | Stein | B01D 1/14 208/106 |
| 2011/0309162 | A1 | 12/2011 | Rock | |
| 2012/0261495 | A1 | 10/2012 | Klimkowski et al. | |
| 2014/0034478 | A1* | 2/2014 | Rock | C02F 1/04 203/11 |

OTHER PUBLICATIONS

International Preliminary Report on Patentability dated Feb. 7, 2017 for Appln. No. PCT/US2015/044153.

* cited by examiner

SYSTEM FOR LIQUID PURIFICATION

CROSS-REFERENCE TO RELATED APPLICATIONS

This is the U.S. National Stage of PCT/US2015/044153, filed Aug. 7, 2015, which in turn claims priority to U.S. Provisional Application No. 62/034,638, filed Aug. 7, 2014 the entire contents of both applications is incorporated herein by reference in their entireties.

BACKGROUND

The embodiments described herein relate to systems and methods for separating unwanted matter from mixtures to obtain substantially pure substances. More particularly, the embodiments described herein relate to systems and methods for separating inorganic salts, trace metals, dissolved gases and/or other impurities from liquids with minimal external thermal energy.

In general, purification of, for example, a fluid is based on the principle of using a substance's intrinsic properties to isolate it from a heterogeneous mixture. Some known purification systems use distillation, utilizing thermal energy and a substance's distinct boiling point, to separate a mixture. Distillation, however, uses a large amount of external energy, and thus, is often resource-intensive and/or relatively expensive. Other known purification systems use reverse osmosis, employing semipermeable membranes and high pressure, to separate a mixture. While many reverse osmosis purification systems do not require much external energy (e.g., thermal energy), the semipermeable membranes are often susceptible to sudden ruptures and/or gradual deterioration, which can require frequent and/or expensive maintenance.

Thus, a need exists for a purification system that is relatively low maintenance and that uses a relatively small amount of external energy (e.g., thermal energy).

SUMMARY

Systems and methods for liquid purification are described herein. In some embodiments, an apparatus includes an atomizer and a separator. The atomizer is configured to mix a solution and a flow of an inlet gas to produce an atomized mixture of the solution and the inlet gas. The atomizer includes a first flow member and a second flow member. The first flow member has an outer surface and defines an outlet opening. The outer surface of the first flow member includes a vane defining at least a portion of a first flow path. The second flow member has a first surface and a second surface and defines a second flow path therebetween. A portion of the first surface defines a mixing volume. The second flow path is configured to convey a flow of the solution and the inlet gas to the mixing volume such that the vane of the first flow member redirects a portion of at least one of a tangential velocity component or a circumferential velocity component of the flow as the solution and the inlet gas flow within the first flow path to produce a rotational velocity component within the flow when the flow is conveyed to the mixing volume. The solution and the inlet gas are configured to mix within the mixing volume to produce a mixture of the solution and the gas. The separator is fluidically coupled to an outlet of the atomizer to receive the mixture of the solution and the inlet gas. The separator is configured to produce a first outlet flow including a vaporized portion of a solvent from the solution and a second outlet flow including a liquid portion of the solvent from the solution and a solute from the solution.

BRIEF DESCRIPTIONS OF DRAWINGS

DETAILED DESCRIPTION

Figure 1:
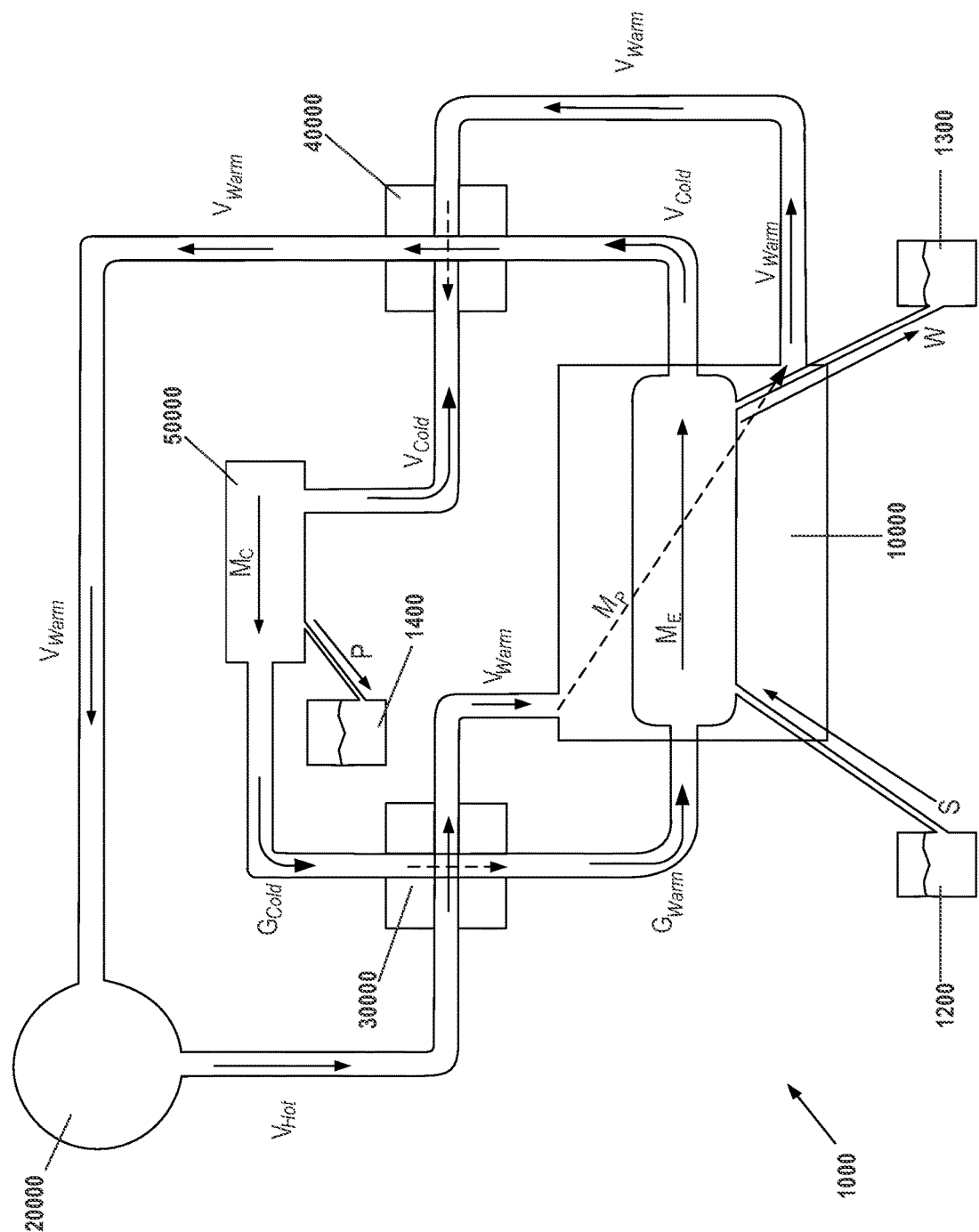
FIG. 1 is a schematic illustration of a liquid purification system according to an embodiment.

In some embodiments, an apparatus includes an atomizer and a separator. The atomizer is configured to mix a solution and a flow of an inlet gas to produce an atomized mixture of the solution and the inlet gas. The atomizer includes a first flow member and a second flow member. The first flow member has an outer surface and defines an outlet opening. The outer surface of the first flow member includes a vane defining at least a portion of a first flow path. The second flow member has a first surface and a second surface and defines a second flow path therebetween. A portion of the first surface defines a mixing volume. The second fluid flow path is configured to convey a flow of the solution and the inlet gas to the mixing volume such that the vane of the first flow member redirects a portion of at least one of a tangential velocity component or a circumferential velocity component of the flow as the solution and the inlet gas flow within the first flow path to produce a rotational velocity component within the flow when the flow is conveyed to the mixing volume. The solution and the inlet gas are configured to mix within the mixing volume to produce a mixture of the solution and the gas. The separator is fluidically coupled to an outlet of the atomizer to receive the mixture of the solution and the inlet gas. The separator is configured to produce a first outlet flow including a vaporized portion of a solvent from the solution and a second outlet flow including a liquid portion of the solvent from the solution and a solute from the solution.

In some embodiments, an apparatus includes an evaporation plenum and an atomizer disposed therein. The atomizer is configured to mix a solution and a flow of an inlet gas to produce an atomized mixture of the solution and the inlet gas. The atomizer includes a first flow member and a second flow member. The first flow member has an outer surface and defines an outlet opening. The second flow member has an outer portion and an inner portion at least partially disposed in the outer portion such that an inner surface of the outer portion is spaced apart from an outer surface of the inner portion to define a first flow path therebetween. The inner portion defines a mixing volume in fluid communication with the first flow path. The first flow path is configured to convey a flow of the solution and the inlet gas to the mixing volume. At least portion of the flow is redirected by a plurality of vanes disposed on the outer surface of the first flow member to produce a rotational velocity component within the flow when the flow is conveyed to the mixing volume. The solution and the inlet gas are configured to mix within the mixing volume to produce a mixture of the solution and the inlet gas. The evaporation plenum defines a second flow path configured to receive a flow of a plenum mixture of the solution and the inlet gas. The plenum mixture flows within the second flow path to transfer thermal energy between the plenum mixture and the solution and the inlet gas within at least one of the first flow path or the mixing volume.

In some embodiments, a method includes conveying a solution containing a solvent and a solute from a solution source to a first flow path defined by a processor chamber of an evaporation subsystem. The processor chamber is disposed in an evaporation plenum included in the evaporation subsystem. A gas is conveyed from a gas source to the first flow path defined by the processor chamber. The first flow path is in fluid communication with a mixing volume such that the solution and the gas flow within the first flow path to the mixing volume. The solution and the gas are mixed in the mixing volume to produce an atomized mixture of the solution and the gas. The mixture is of the solution and the gas is conveyed to a separator that is configured to produce a first outlet flow containing a vaporized portion of the solvent and a second outlet flow containing a liquid portion of the solvent and the solute. A plenum mixture of the solution and the gas is conveyed to a second flow path defined by the evaporation plenum to transfer thermal energy between the plenum mixture flowing within the second flow path and the flow of the solution and the gas within at least one of the first flow path or the mixing volume.

In some embodiments, an apparatus includes an atomizer and a separator. The atomizer is configured to mix a solution and a flow of an inlet gas to produce an atomized mixture of the solution and the inlet gas. The atomizer includes a first flow member and a second flow member. The first flow member has a first surface and a second surface and defines a first flow path therebetween. A portion of the first surface defines a mixing volume. The second flow member has an outer surface and defines an outlet opening. The outer surface of the second flow member includes a vane defining at least a portion of a second flow path. The first flow path is configured to convey a flow of the solution and the inlet gas to the mixing volume. At least a portion of the flow is conveyed to the second flow path via the first flow path such that the vane redirects a portion of at least one of a tangential velocity component or a circumferential velocity component of the flow as the solution and the inlet gas flow within the second flow path to produce a rotational velocity component within the flow when the flow is conveyed to the mixing volume. The solution and the inlet gas are configured to mix within the mixing volume to produce a mixture of the solution and the gas. The separator is configured to be fluidically coupled to the outlet opening of the second flow member. The separator is configured to receive the mixture of the solution and the inlet gas, and produce a first outlet flow and a second outlet flow. The first outlet flow includes a vaporized portion of a solvent from the solution. The second outlet flow includes a liquid portion of the solvent from the solution and a solute from the solution.

In some embodiments, a liquid purification system is configured to receive feed liquid containing one or more impurities and produce a product liquid substantially free of impurities. In some embodiments, the system includes an evaporation subsystem with two materially isolated portions: an evaporation core defining a first flow path and an evaporation plenum defining a second flow path. The first flow path (e.g., the "core" flow path) facilitates the introduction of new feed liquid into the system. The second flow path (e.g., the "plenum" flow path) warms a fluid flowing within the first flow path to increase a vaporization of the fluid.

In some embodiments, an evaporator assembly is configured to receive a mixture of a gas and a solution and to vaporize a portion of a solvent from the solution. The evaporator assembly includes an inlet flow member having a first surface and a second surface, a diffuser having a first surface and a second surface, and a separator. A first portion of the first surface of the diffuser and the first surface of the inlet flow member collectively define a first flow path. The second surface of the diffuser defines a second flow path that diverges along a longitudinal axis of the evaporator assembly. A second portion of the first surface of the diffuser and the second surface of the inlet flow member collectively define an evaporation volume between the first flow path and the second flow path. At least one of the first portion of the first surface of the diffuser or the first surface of the inlet flow member includes multiple vanes configured to produce a rotational velocity component within a flow of the mixture of the solution and the gas when the flow exits the first flow path into the evaporation volume. The separator is fluidically coupled to the second flow path and is configured to receive the mixture of the gas and the solution. The separator is configured to produce a first outlet flow including a portion of the gas and the vaporized portion of the solvent, and a second outlet flow including a liquid portion of the solvent from the solution and a solute from the solution.

In some embodiments, an evaporator assembly is configured to receive a mixture of a gas and a solution and to vaporize a portion of a solvent from the solution. The evaporator assembly includes an inlet flow member having a first surface and a second surface, a diffuser having a first surface and a second surface, and a separator. A first portion of the first surface of the diffuser and the first surface of the inlet flow member collectively define a first flow path. The second surface of the diffuser defines a second flow path that diverges along a longitudinal axis of the evaporator assembly. The second surface of the diffuser includes at least on discontinuity within the second flow path. A second portion of the first surface of the diffuser and the second surface of the inlet flow member collectively define an evaporation volume between the first flow path and the second flow path. The separator is fluidically coupled to the second flow path and is configured to receive the mixture of the gas and the solution. The separator is configured to produce a first outlet flow including a portion of the gas and the vaporized portion of the solvent, and a second outlet flow including a liquid portion of the solvent from the solution and a solute from the solution.

In some embodiments, an atomizer assembly is configured to mix a solution and a gas to produce at least a partially atomized mixture of the solution and the gas. The atomizer assembly includes an injector nozzle and a diffuser. The injector nozzle defines multiple elongated exit openings through which the solution can be conveyed from a source into a mixing chamber. The diffuser includes a first surface and a second surface. The first surface of the diffuser defines at least a portion of a gas flow path through which the gas can be conveyed into the mixing chamber. The second surface of the diffuser defining an outlet flow path that diverges along a longitudinal axis of the atomizer assembly. The first surface of the diffuser includes multiple vanes configured to produce a rotational velocity component within the flow of the gas when the flow exits the gas flow path into the mixing volume. A separator is fluidically coupled to the second flow path and is configured to receive the mixture of the gas and the solution. The separator is configured to produce a first outlet flow including a portion of the gas and the vaporized portion of the solvent, and a second outlet flow including a liquid portion of the solvent from the solution and a solute from the solution.

In some embodiments, a method includes conveying an inlet solution from a source into a mixing volume via an outlet opening defined by an injector nozzle of an atomizer. An inlet gas is conveyed into the mixing volume via a gas flow path defined, at least in part, by a diffuser to produce a partially atomized mixture of the inlet solution and the inlet gas. The diffuser includes multiple vanes configured to produce a rotational velocity component within a flow of the gas when the flow exits the gas flow path into the mixing volume. The method includes vaporizing a portion of a solvent from the solution and separating the mixture of the inlet gas and the inlet solution to produce a first outlet flow and a second outlet flow. The first outlet flow includes a portion of the inlet gas and the vaporized portion of the solvent from the solution. The second outlet flow includes a liquid portion of the solvent from the solution and a solute from the solution.

As used in this specification, the terms "atomize" and "vaporize" describe the process of reducing a liquid or solution into a series of tiny particles, droplets and/or a fine spray. For example, as used herein, a device or component configured to atomize a liquid and/or produce and atomized flow of a liquid can be any suitable device or component that reduces and/or "breaks" the liquid into a series of tiny particles and/or a fine spray such as, for example, a nozzle, injector, orifice, etc.

As used herein, the term "fluid" can refer to any suitable substance, mixture, material, gas, liquid, etc. that substantially continually deforms and/or flows in response to an applied stress (e.g., shear stress). Moreover, a substance or the like can be a fluid when the substance is in a liquid phase, a gas phase, and/or a plasma phase. For example, a substance in its liquid phase flowing within a flow path can be referred to as a fluid flowing within the flow path. If, for example, the substance receives thermal energy sufficient to transition the substance to its gas phase, the substance flowing within the flow path can similarly be referred to as the fluid flowing within the flow path. Thus, the term "fluid" can generally refer to a substance, a mixture, a gas, a liquid, and/or an otherwise non-solid material irrespective of its phase.

As used herein, the terms "about" and "approximately" generally mean plus or minus 10% of the value stated. For example, about 0.5 would include 0.45 to 0.55, about 10 would include 9 to 11, and about 1000 would include 900 to 1100.

As used herein, the term "set" can refer to multiple features or a singular feature with multiple parts. For example, when referring to set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. For example, a monolithically constructed wall can include a set of shoulders that can be said to form a set of walls. A set of walls can also be fabricated from multiple items that are produced separately and are later joined together (e.g., via a weld, an adhesive, or any suitable method).

As used herein, the term "parallel" generally describes a relationship between two geometric constructions (e.g., two lines, two planes, a line and a plane or the like) in which the two geometric constructions are substantially non-intersecting as they extend substantially to infinity. For example, as used herein, a line is said to be parallel to another line when the lines do not intersect as they extend to infinity. Similarly, when a planar surface (i.e., a two-dimensional surface) is said to be parallel to a line, every point along the line is spaced apart from the nearest portion of the surface by a substantially equal distance. Two geometric constructions are described herein as being "parallel" or "substantially parallel" to each other when they are nominally parallel to each other, such as for example, when they are parallel to each other within a tolerance. Such tolerances can include, for example, manufacturing tolerances, measurement tolerances or the like.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

FIG. 1 is a schematic illustration of a liquid purification system 1000 (also referred to herein as "system") according to an embodiment. The system 1000 includes an evaporation subsystem 10000 with two materially isolated portions (e.g., an evaporation core that is fluidically isolated from an evaporation plenum), an airflow subsystem 20000, a pair of heat exchanger subsystems 30000 and 40000, and a condenser subsystem 50000. As described in more detail herein, the system 1000 is configured to receive feed liquid containing one or more impurities (e.g., inorganic salts, trace metals, dissolved gases) and produce a product liquid substantially free of the impurities. In some embodiments, feed liquid S enters the system 1000 via an inlet in the evaporation core of evaporation subsystem 10000. The feed liquid S can be stored in a source reservoir 1200. In the evaporation core of the evaporation subsystem 10000, the feed liquid S is mixed with warm, dry inlet gas $G_{Warm}$ to form an evaporation mixture $M_E$. The evaporation mixture $M_E$ is processed in the evaporation core of the evaporation subsystem 10000. The products exit the evaporation core of the evaporation subsystem 10000 either as cold vapor $V_{Cold}$ substantially free of impurities or as feed liquid with a relatively high concentration of impurities or liquid waste W. The liquid waste W can be collected in a waste reservoir 1300.

The cold vapor $V_{Cold}$ flows through the heat exchanger subsystem 40000 (also referred to herein as the "second heat exchanger"). The cold vapor $V_{Cold}$ flows through a first flow path defined by the second heat exchanger 40000 and absorbs heat from a fluid flowing within a second flow path defined by the second heat exchanger subsystem 40000 (discussed herein). The vapor exits the second heat exchanger subsystem 40000 as warm vapor $V_{Warm}$. The two flow paths defined by the second heat exchanger subsystem 40000 are thermally connected with each flow path remaining materially and/or fluidically isolated.

The warm vapor $V_{Warm}$ exits the second heat exchanger subsystem 40000 and flows into the airflow subsystem 20000 where it is heated, compressed, accelerated, and directed into a first flow path of the heat exchanger subsystem 30000 (also referred to herein as the "first heat exchanger"). The now hot vapor $V_{Hot}$ transfers a portion of its heat energy to a fluid flowing within a second flow path defined by the first heat exchanger subsystem 30000 and exits the first heat exchanger as warm vapor $V_{Warm}$. The two flow paths in the first heat exchanger subsystem 30000 are thermally connected with each flow remaining materially and/or fluidically isolated.

The warm vapor $V_{Warm}$ is then directed into the evaporation plenum of the evaporation subsystem 10000 where it transfers heat to the evaporation mixture $M_E$, warming the evaporation core. The warm vapor $V_{Warm}$ exits the evaporation plenum is directed into the second heat exchanger subsystem 40000 where the vapor, previous identified as the second flow path of second heat exchanger subsystem 40000, transfers heat to the cold vapor $V_{Cold}$ that exited the evaporation core of evaporation subsystem 10000 (mentioned previously).

The now cold vapor $V_{Cold}$ flowing within the second flow path exits the second heat exchanger subsystem 40000 and flows to the condenser subsystem 50000. The conditions of the condenser subsystem 50000 drive the cold vapor $V_{Cold}$ to gradually liquefy. The drying condenser vapor $M_C$ flows through the condenser subsystem 50000 and becomes either the product liquid P or cold gas substantially free of vapor ($G_{Cold}$). The product liquid P exits the condenser subsystem 50000 and can be collected in a product reservoir 1400. The cold gas $G_{Cold}$ exits the condenser subsystem 50000 and flows to the first heat exchanger subsystem 30000 where the cold gas $G_{Cold}$, previously identified as the fluid flowing within the second flow path of the first heat exchanger subsystem 30000, absorbs heat from the hot vapor $V_{Hot}$ leaving the airflow subsystem 20000 (mentioned previously). The resultant warm inlet gas $G_{Warm}$ enters the evaporation core of the evaporation subsystem 10000 where it mixes with feed liquid S, thus completing the self-contained loop of the system 1000.

In some embodiments, the system 1000 or any of its subsystems can be an isobar, an isotherm, an adiabat, or a combination thereof. In some embodiments, the inlet gas $G_{Warm}/G_{Cold}$ can be atmospheric air (e.g., a mixture $N_2$, $O_2$ and trace elemental gases), inert elemental gas (e.g., He, Ar, Kr, etc.), diatomic gases (e.g., $N_2$, $O_2$, $H_2$, etc.), minute amounts of source liquid, or a combination thereof. In some embodiments, the flow of the inlet gas $G_{Warm}/G_{Cold}$ and/or vapor $V_{Cold}/V_{Warm}/V_{Hot}$ of the system 1000 can be driven by an external airflow subsystem 20000. In some embodiments, the flow is driven by Brownian motion.

The feed liquid S can be any suitable liquid mixture with two or more components configured to be separated. In some embodiments, the feed liquid can be water with any unwanted substance (e.g., trace metals, dissolved solids, microorganisms, etc.). For example, the feed water can be obtained from a lake, stream, ocean, pond, and/or any naturally occurring body of water. The aforementioned feed water can also be from unnatural sources including, but not limited to, sewage/waste treatment facilities, and farm runoff. The feed liquid may also be water involved in hydraulic fracturing, fracking, with dissolved organic additives (e.g., ammonia, carbon dioxide, ethylenediaminetetracetic acid etc.). The feed liquid may be a mixture of liquid hydrocarbons (e.g., pentanes, hexanes, heptanes, octanes, etc.) or a liquid hydrocarbon with one or more organic gases (e.g., methane, ethane, butane, etc.) and/or organic solids (e.g., naphthalenes, tars, asphaltenes etc.), or any suitable combination thereof.

In some embodiments, the system 1000 can be configured to receive feed liquid S from a discrete source reservoir 1200, which can be refilled and/or replaced. In other embodiments, the system 1000 can be configured to receive feed liquid S from a substantially endless and/or constantly replenishing liquid source (not shown in FIG. 1). In some embodiments, the system 1000 can be configured to passively (e.g., through gravitational forces and/or diffusive movement) receive feed liquid S from a liquid source. In some embodiments, the system 1000 can be configured to actively pull and/or push feed liquid S from a liquid source through various means (e.g., mechanic, electronic, barometric, etc.). In some embodiments, the system 1000 can be configured to be movable to allow for easy transport between various immovable liquid sources.

In some embodiments, the feed liquid S can enter the system 1000 through one or more inlet hoses and/or pipes (not shown in FIG. 1). Said inlet hoses and/or pipes can have one or more valves and/or regulators to control the influx and/or flow rate of the feed liquid S. In some embodiments, the system 1000 can be configured to filter out large materials (e.g., sediment, plant matter, trash, etc.) from the feed liquid S prior to conveying the feed liquid S to the evaporation subsystem 10000. In some embodiments, the system 1000 can be configured to heat or cool the feed liquid S prior to conveying the feed liquid to the evaporation subsystem 10000. In some embodiments, the feed system (not shown in FIG. 1) can be configured to be materially linked (e.g., fluidically coupled) to the rest of the system to aid in keeping the system self-sustaining and/or thermodynamically stable. In some embodiments, the feed liquid S can be regulated by an automated or semi-automated control system. Said control system can be physically attached to the system 1000 or located in a remote location offsite. Said control system can be configured to operate under a series of highly regulated protocols or maintain a set of acceptable parameters or a combination.

The airflow subsystem 20000 is configured to drive the flow of material through the system 1000. The airflow subsystem 20000 can include various components (not shown in FIG. 1) to help maintain a substantially unidirectional flow of fluid (e.g., air) through the system 1000. The airflow subsystem 20000 can facilitate the flow of fluid through the system in ways, including, but not limited to, increasing/decreasing flow velocity, increasing/decreasing flow temperatures, increasing/decreasing flow volumes, and/or increasing/decreasing flow pressures. More specifically, in some embodiments, the airflow subsystem 20000 compresses and warms an inlet flow of source vapor (e.g., the output $V_{Warm}$ from the second heat exchanger subsystem 40000) to produce an outlet flow of vapor $V_{Hot}$ bound for the first heat exchanger subsystem 30000. Due to the compression of the airflow subsystem 20000, the temperature of the outlet hot vapor (e.g., 80° C.-100° C.) is greater than the temperature of the inlet warm vapor (e.g., 35° C.-45° C.).

As mentioned previously, the hot vapor $V_{Hot}$ flows from the airflow subsystem 20000 to the first heat exchanger subsystem 30000. The first heat exchanger subsystem 30000 includes two discrete flow paths. The first flow path (e.g., the "hot" side) receives the inlet hot vapor $V_{Hot}$ from the airflow subsystem 20000 (e.g., 85° C.-100° C.) and sends the outlet warn vapor $V_{Warm}$ bound for the evaporation plenum of the evaporation subsystem 10000 (e.g., 40° C.-50° C.). The second flow path (e.g., the "cold" side) receives the inlet cold gas $G_{Cold}$ from the condenser subsystem 50000 (e.g., 15° C.-20° C.) and sends the outlet warm gas $G_{Warm}$ bound for the evaporation core of the evaporation subsystem 10000 (e.g., 40° C.-50° C.). The two flow paths are thermally connected and thus the fluid flowing within the second flow path can absorb heat from the fluid flowing within the first flow path and can exit the first heat exchanger subsystem 30000 at a temperature above a temperature of the fluid at the input of the second flow path. Conversely, the fluid flowing within the first flow path, after transferring heat to the fluid flowing within the second flow path, exits the first heat exchanger subsystem 30000 at a temperature below a temperature of the fluid at the input of the first flow path.

As shown in FIG. 1, the second heat exchanger subsystem 40000 functions analogously to the first heat exchanger subsystem 30000 (e.g., with two discrete flow paths). The first flow path of the second heat exchanger subsystem 40000 (e.g., the "cold" side) receives an inlet cold vapor $V_{Cold}$ (e.g., 20° C.-25° C.) from the evaporation core of the evaporation subsystem 10000 and sends an outlet warm vapor $V_{warm}$ (e.g., 35° C.-45° C.) bound for the airflow subsystem 20000. The second flow path (e.g., the "hot" side) receives an inlet warm vapor $V_{Warm}$ (e.g., 55° C.-65° C.) from the evaporation plenum of the evaporation subsystem 10000 and sends an outlet cold vapor $V_{Cold}$ (e.g., 40° C.-45° C.) bound for the condenser subsystem 50000. The two flow paths are thermally connected (while remaining fluidically isolated) and thus the fluid flowing within the first flow path can absorb heat from the fluid flowing within the second flow path and can exit the second heat exchanger 40000 at a temperature above a temperature of the fluid at the input of the first flow path. Conversely, the fluid flowing within the second flow path, after transferring heat to the fluid flowing within the first flow path, exits the second heat exchanger subsystem 40000 at a temperature below a temperature of the fluid at the input of the second flow path.

As shown in FIG. 1, after exiting the second heat exchanger subsystem 40000, the cold vapor $V_{Cold}$ enters the condenser subsystem 50000. The condenser subsystem 50000 includes a condenser element and a condenser casing (not shown in FIG. 1). The condenser casing serves to thermally insulate the condenser element to increase and/or enhance liquefaction of the vapor. In some embodiments, the condenser casing has an outlet duct and/or pipe (not shown in FIG. 1) attached to a product reservoir 1400 to collect product liquid P. The condenser element can be any structure and/or material that absorbs the heat from the vapor and that drives product formation.

More specifically, the cold vapor $V_{Cold}$ enters the condenser subsystem 50000 from the second heat exchanger subsystem 40000. Upon contact with the condenser element, the vapor rapidly liquefies with heat from the cold vapor $V_{Cold}$ being absorbed by the thermally conductive elements of the condenser subsystem 50000. The temperature of the of the condenser vapor $M_C$ decreases as it flows through the condenser subsystem 50000. At the end of the condenser subsystem 50000, the fluids and/or materials exit as either product liquid P or as cold gas substantially free of liquid vapor $G_{Cold}$.

As mentioned previously, the evaporation subsystem 10000 has two materially isolated portions: an evaporation core and an evaporation plenum each with a flow path fluidically isolated from the other. The first flow path (e.g., the "core" flow path) facilitates the introduction of new feed liquid into the system. The second flow path (e.g., the "plenum" flow path) facilitates heat transfer to the core flow path to increase vaporization of the fluid therein. Although not shown in FIG. 1, the evaporation core of the evaporation subsystem 10000 includes a separator section and a series of processor pods collectively defined as the processor section. The processor pods include a nozzle component, and a dual layered (e.g., having an inner shell and an outer shell) processor chamber (not shown in FIG. 1). As described in more detail herein, the feed liquid S enters the evaporation core of evaporation subsystem 10000 and is mixed with dry inlet gas $G_{Warm}$ to produce the evaporation mixture $M_E$. The evaporation mixture $M_E$ flows through a series of processors pods and the separator section, and exits the evaporation core of the evaporation subsystem 10000 as either cold vapor $V_{Cold}$ bound for the second heat exchanger subsystem 40000 or as liquid waste W bound for the waste reservoir 1300.

More specifically, the feed liquid S is injected into the evaporation core of the evaporation subsystem 10000. Given a relatively low vapor pressure of the evaporation core a relatively large portion of the feed liquid S instantaneously vaporizes or at least substantially vaporizes in a relatively short amount of time (e.g., less than a second or faster). The vapor mixes with dry inlet gas $G_{Warm}$ and enters the first processor pod (not shown in FIG. 1). In some embodiments, the evaporation subsystem 10000 can be configured to function with one processor pod. In other embodiments, the evaporation subsystem 10000 can be configured to function with any suitable number of processor pods. The nozzle forces the evaporation mixture $M_E$ and any excess feed liquid S into the outer shell of the processor chamber. In some embodiments, the nozzle can have a series of vanes, which assist in generating the cyclonic vapor flow. Such vanes can be arranged in any fashion to promote airflow including radial distribution at various angles (e.g., 20°, 40°, 80°, etc.). In some embodiments, the outer shell of the processor chamber can also have any suitable surface features (e.g., grooves, shoulders, ridges, etc.) to aid in airflow.

Upon exiting the final processor pod, the vapor $V_{Cold}$ is fed into the separator section of the evaporation subsystem 10000. Maintaining the cyclical flow of the evaporation subsystem, the separator section increases the separation between the pure liquid vapor $V_{Cold}$ and the liquid waste W, which is highly concentrated with solutes and thus cannot vaporize. The liquid waste W is directed to the ducts and/or pipes that lead to the waste reservoir 1300. The substantially pure liquid vapor $V_{Cold}$ is directed to the ducts and/or pipes that lead to the second heat exchanger subsystem 40000 (as described above). The separator can be any suitable mechanism and/or series of mechanisms to aid in creating a physical separation between the substantially pure liquid vapor $V_{Cold}$ and waste liquid W. This includes, but is not limited to, physical barriers, polarized partial pressure systems, and/or phase specific mechanisms.

As mentioned previously, the evaporation plenum of the evaporation subsystem 10000 defines a flow path that is fluidically isolated from the evaporation core flow path. The evaporation plenum flow path facilitates heat transfer from the fluid flowing therein to the fluid flowing within the core flow path. The plenum can be formed from any material and/or structure, which allows for material and/or fluidic isolation between the two flow paths of the evaporation subsystem 10000, while increasing flow and reducing heat loss. The second flow path is materially and fluidically isolated from the first flow path but shares thermal contact via the inner shell of the processor pod (not shown in FIG. 1).

Figure 2:
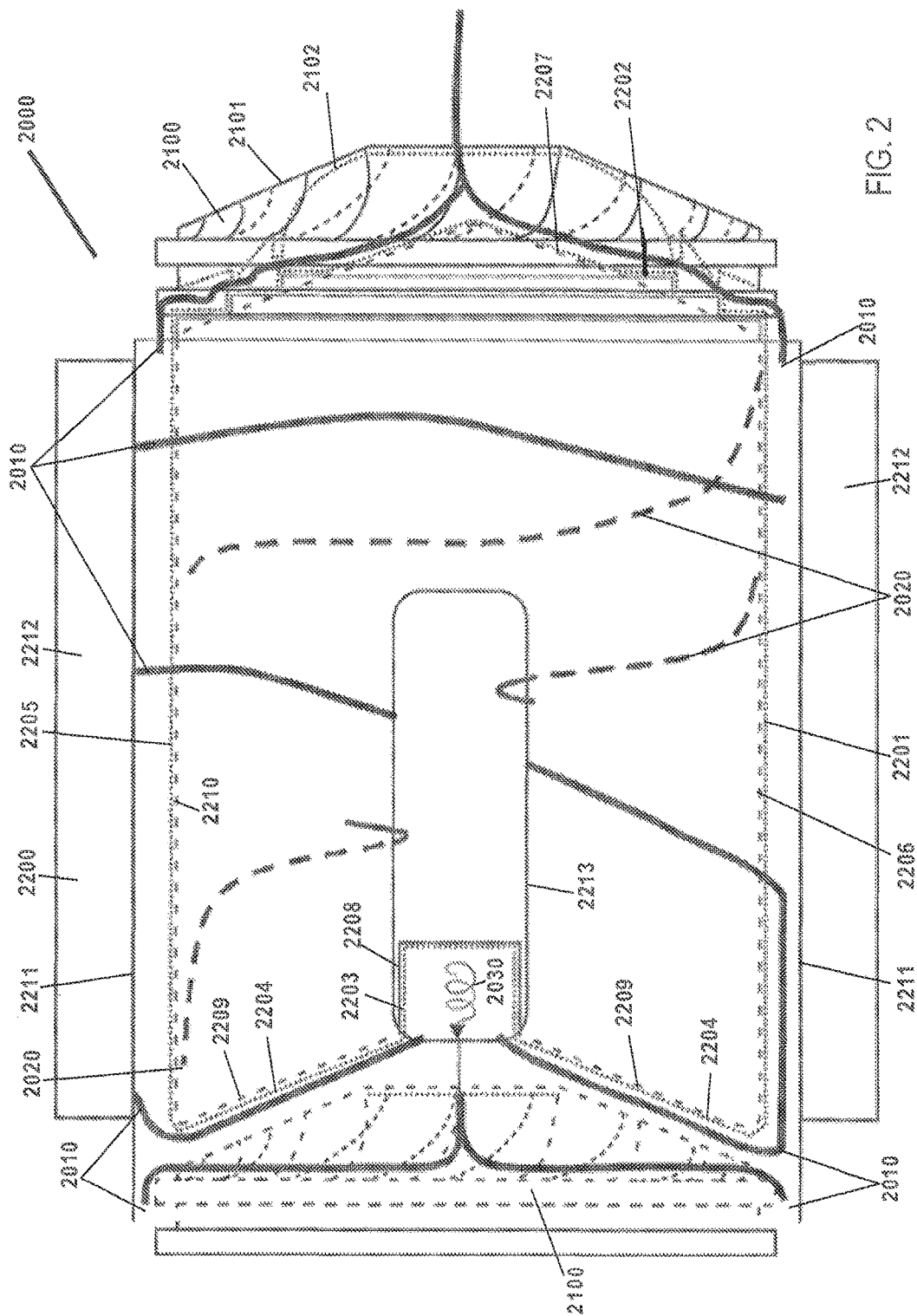
FIG. 2 is a schematic illustration of a processor pod according to an embodiment.
Figure 3:
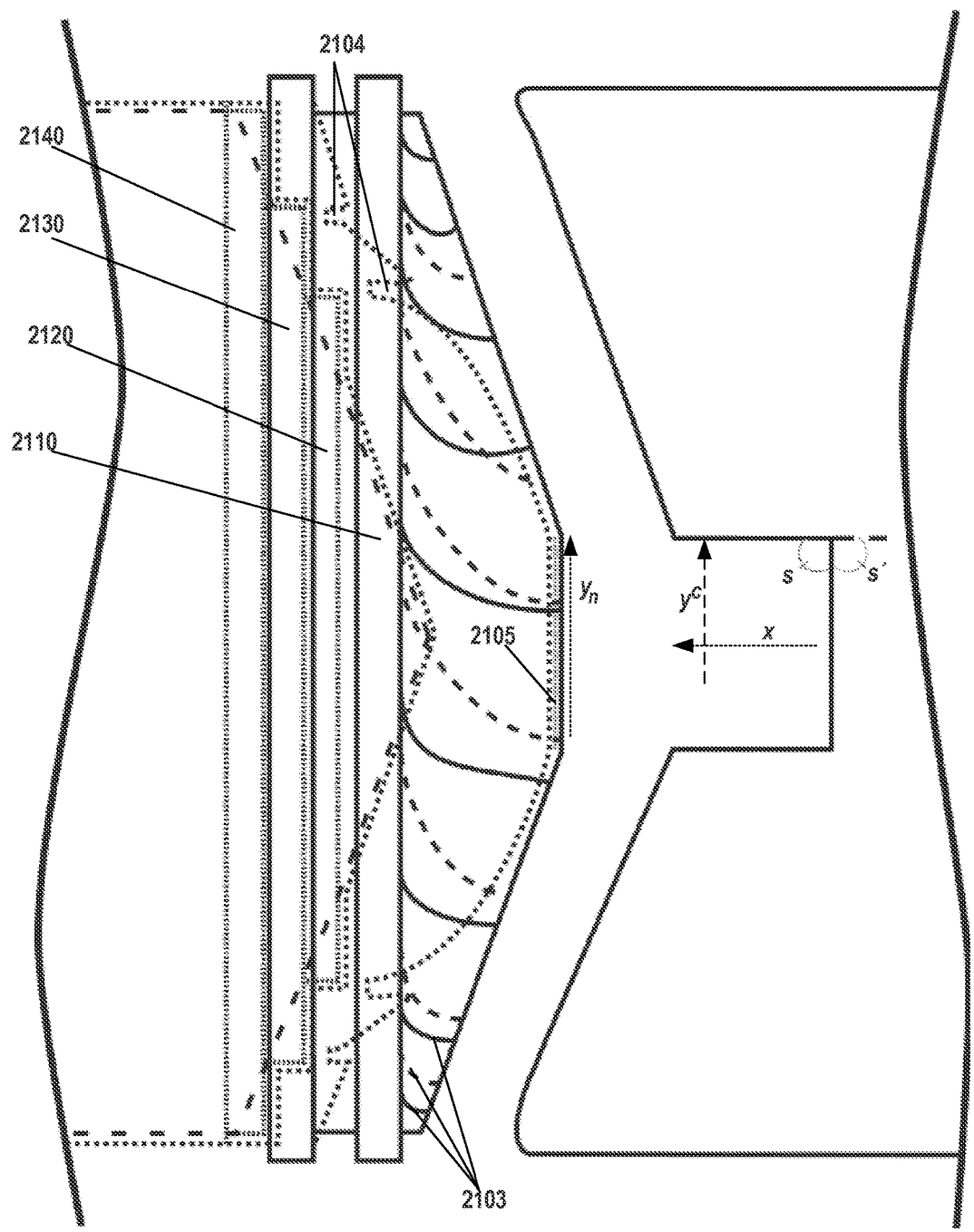
FIG. 3 is a schematic illustration of a junction of two adjacent processor pods according to an embodiment.

FIGS. 2 and 3 are schematic illustrations of a processor pod 2000 and the junction of two adjacent processor pods, respectively, according to an embodiment. As mentioned previously, the processor pod 2000 defines two flow paths fluidically isolated from each other. The first flow path 2010 (e.g., the "core" flow path) receives inlet gas $G_{Cold}$ and feed liquid S to form an evaporation mixture $M_E$ (e.g., see FIG. 1) bound for the separator section (not shown in FIG. 2). The second flow path 2020 (e.g., the "plenum" flow path) receives inlet warm vapor $V_{Warm}$ (also referred to herein as the "evaporation plenum mixture $M_P$"), which in turn, transfers heat to the evaporation mixture $M_E$ flowing within the first flow path to increase vaporization thereof. As mentioned previously, the system 1000 can be configured to function with only one processor pod, or a series of pods.

The processor pod 2000 includes a nozzle 2100 having a first surface 2101 and a second surface 2102, and a processor chamber 2200 (also referred to herein as "chamber") having a first surface 2201, a second surface 2206, and a third surface 2211. The first surface 2201 of the chamber 2200 has four portions: a first portion 2202, a second portion 2203, a third portion 2204, and a fourth portion 2205. The second surface 2206 of the chamber 2200 also has four portions: a first portion 2207, a second portion 2208, a third portion 2209, and a fourth portion 2210. The second surface 2102 of the nozzle 2100, the first surface 2201 of the chamber 2200, and the third surface 2211 of the chamber 2200 collectively define the first flow path 2010 within which the evaporation mixture $M_E$ can flow. The second surface 2206 of the chamber 2200 defines the second flow path 2020 within which the evaporation plenum vapor $M_P$ can flow and transfer heat to the first flow path 2010. The second portion 2203 of the first surface 2201 of the chamber 2200 defines a cylindrical pocket in which the liquid-gas mixture 2030 (also referred to herein as "pocket mixture") collects and is directed towards the first surface of an adjacent nozzle (e.g., see FIG. 3).

The nozzle 2100 can be any suitable device, mechanism, or component that is configured to direct the flow of the inlet gas $G_{Cold}$, the feed liquid S, and/or the evaporation mixture $M_E$ along the first flow path 2010. The first surface 2101 of the nozzle 2100 can be any suitable surface and/or surface feature configured to direct either: the flow of the inlet gas $G_{Cold}$, the feed liquid S, and/or the evaporation mixture $M_E$ entering the processor pod 2000, or the pocket mixture 2030 from a previous processor pod to the opening 2105 of the nozzle 2100. For example, as shown in FIG. 3, the first surface 2101 of the nozzle 2100 includes a set of vanes 2103. As mentioned previously, the vanes 2103 can be configured in any suitable geometry to drive the evaporation mixture $M_E$ and/or pocket mixture 2030 into the nozzle 2100. The vanes 2103 can be arranged in a radial pattern at any suitable spacing. In some embodiments, the vanes 2103 can have an internal angle or can be straight or a combination thereof. In some embodiments, the vanes 2103 can diminish in height as they approach the center of the first surface 2101 of the nozzle 2100 or can maintain a constant height or a combination thereof. The second surface 2102 of the nozzle 2100 can be any suitable surface and/or surface feature configured to direct the flow of inlet gas $G_{Cold}$, the feed liquid S, and/or the evaporation mixture $M_E$ entering the processor pod 2000, or the pocket mixture 2030 from a previous processor pod to the edge of the nozzle and into the gap between the first surface 2201 of the chamber 2200 and the third surface 2211 of the chamber 2200. For example, as shown in FIG. 3, the second surface 2102 of the nozzle 2100 includes a set of ridges 2104. The ridges 2104 can be any suitable surface element that increases the number of contact points with the chamber 2200 and/or that reduces friction between components. In some embodiments, the second surface 2102 of the nozzle 2100 can be smooth (e.g., devoid of any grooves and/or ridges).

The chamber 2200 can be any suitable device mechanism, or component that is configured to direct the flow of evaporation mixture $M_E$ through the evaporation core while simultaneously facilitating thermal exchange between said evaporation mixture $M_E$ and the evaporation plenum vapor $M_P$. The first surface 2201 of the chamber 2200 can define any suitable surface and/or surface features, which defines the minimum diameter of the first flow path 2010, facilitates heat transfer from the second flow path 2020, and directs the pocket mixture 2030 into the cylindrical pocket of the processor chamber 2200. For example, the first portion 2202 of the first surface 2201 of the chamber 2200 has a series of ridges 2110, 2120, 2030 and 2140 that increase contact points with the first portion 2207 of the second surface 2206 of the chamber 2200. The series of ridges 2110, 2120, 2130, and 2140 optimize the first flow path 2010. More specifically, as shown in FIG. 2, the series of ridges 2110, 2120, 2130 and 2140 are arranged to drive the fluid within the first flow path 2010 to the gap between the first surface 2201 of the chamber 2200 and the third surface 2211 of the chamber 2200. In some embodiments, extending contact between the first flow path 2010 and the first surface 2201 of the chamber 2200 increases the heat transfer from the fluid flowing within the second flow path 2020, thus further saturating the inlet gas $G_{Cold}$ and increasing and/or enhancing the vaporization of the feed liquid S.

The second surface 2206 of the chamber 2200 can define any suitable surface and/or surface features, which define the maximum diameter of the second flow path 2020 and facilitate heat transfer to fluid flowing within the first flow path 2010. For example, the second flow path 2020 is in material contact with the plenum via a processor vent 2213, which simultaneously maintains material and/or fluidic isolation from the first flow path 2010. The processor vent 2213 allows for the continual flow of evaporation plenum vapor $M_P$, allowing for maximum heat transfer to the core flow path 2010 and allowing for increased vaporization of the fluid flowing within the core flow path 2010. The vents 2213 can be positioned in any orientation and/or can have any size that facilitates the evaporation plenum vapor flow (not shown in FIG. 2).

The third surface 2211 of the chamber 2200 can be defined as any suitable surface and/or surface features which define the maximum diameter of the first flow path 2010. For example, the third surface 2211 of the chamber 2200 is defined by and/or otherwise includes a pair of processor fins 2212. These processor fins 2212 aid in directing the evaporation plenum vapor $M_P$ and reduce resistance in the second flow path 2020. In some embodiments, the third surface 2211 can have grooves and/or ridges to better direct the primary flow path 2010 (not shown in FIG. 2).

As mentioned previously, the second portion 2203 of the first surface 2201 of the chamber 2200 defines the cylindrical pocket in which the pocket mixture 2030 collects and is directed to the opening of the nozzle of the subsequent processor pod. As shown in FIG. 3, the cylindrical pocket can be highly variable. For example, the pocket diameter $y_c$ can be any suitable size sufficient to handle the flow demands of the system 1000. Likewise, the pocket depth x can be any depth sufficient to handle the flow demands of the system 1000. Similarly, the pocket tip can be convex, concave, or flat with the angle of concavity s (or convexity s') being any suitable angle from 0° to 90°. In some embodiments, the pocket diameter $y_n$ is the same as the nozzle opening diameter $y_n$ with the pocket depth x having a value of about ¾ of the pocket diameter $y_c$.

Figure 4:
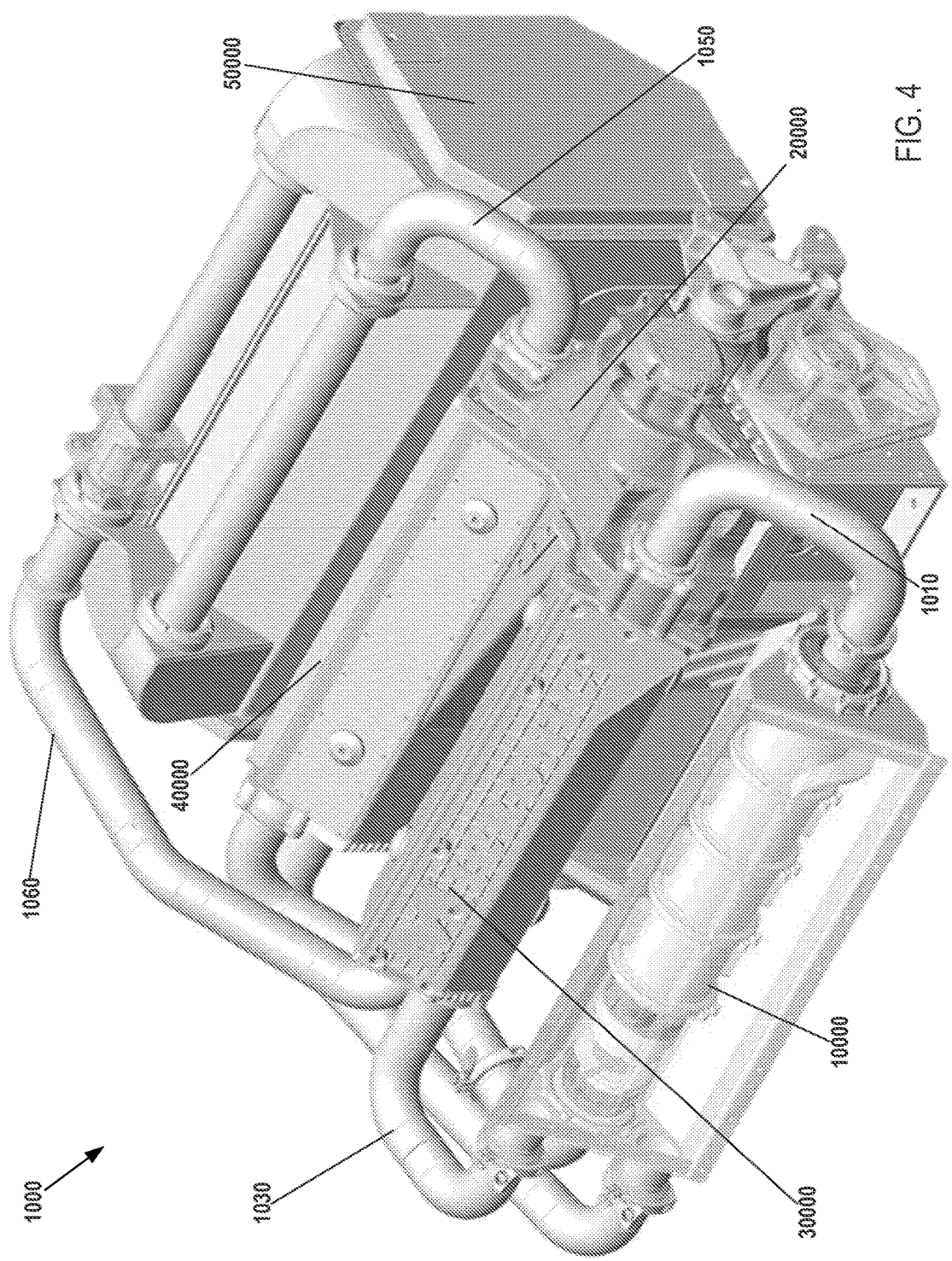
FIGS. 4 and 5 are perspective views of a liquid purification system according to an embodiment.
Figure 5:
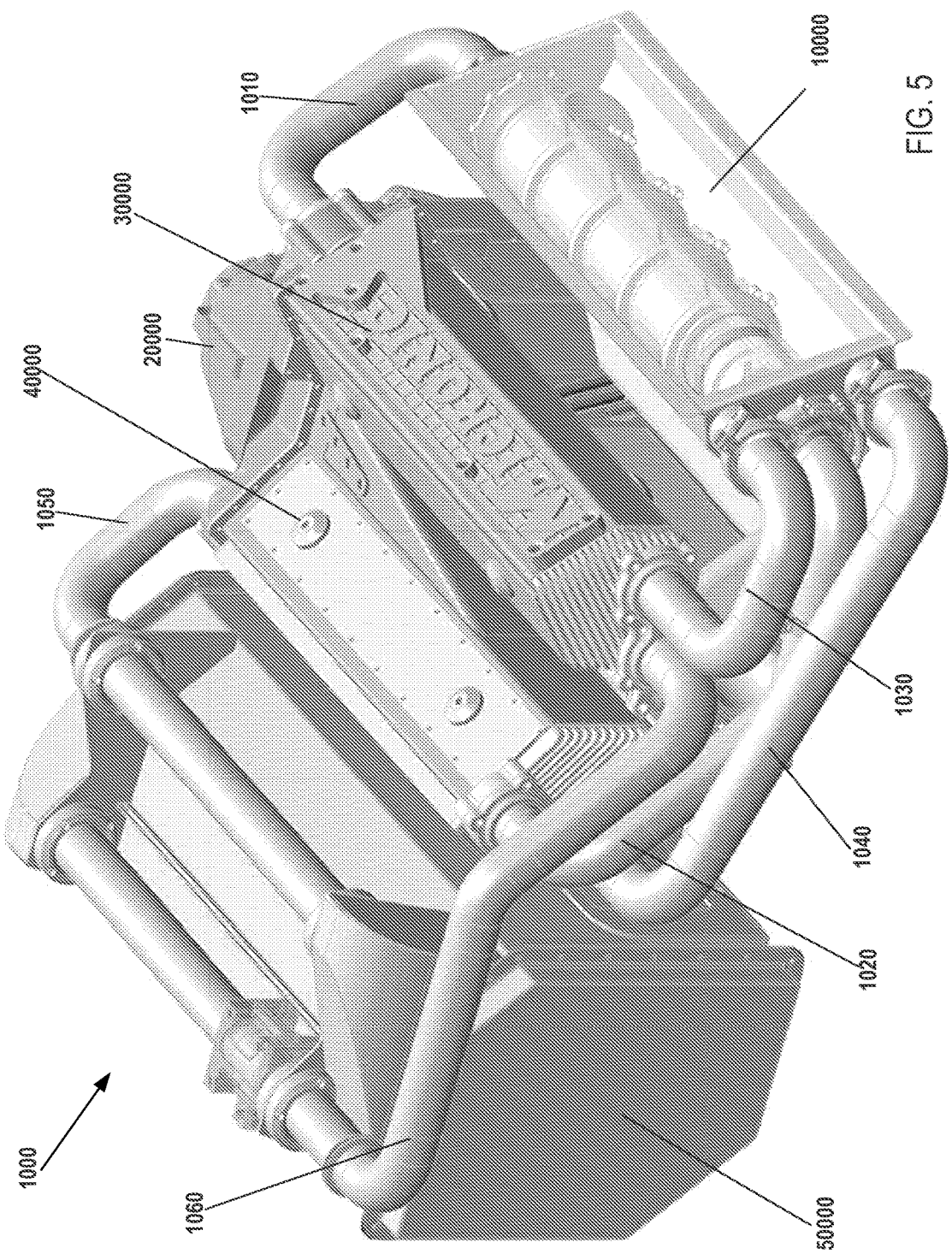
Figure 6:
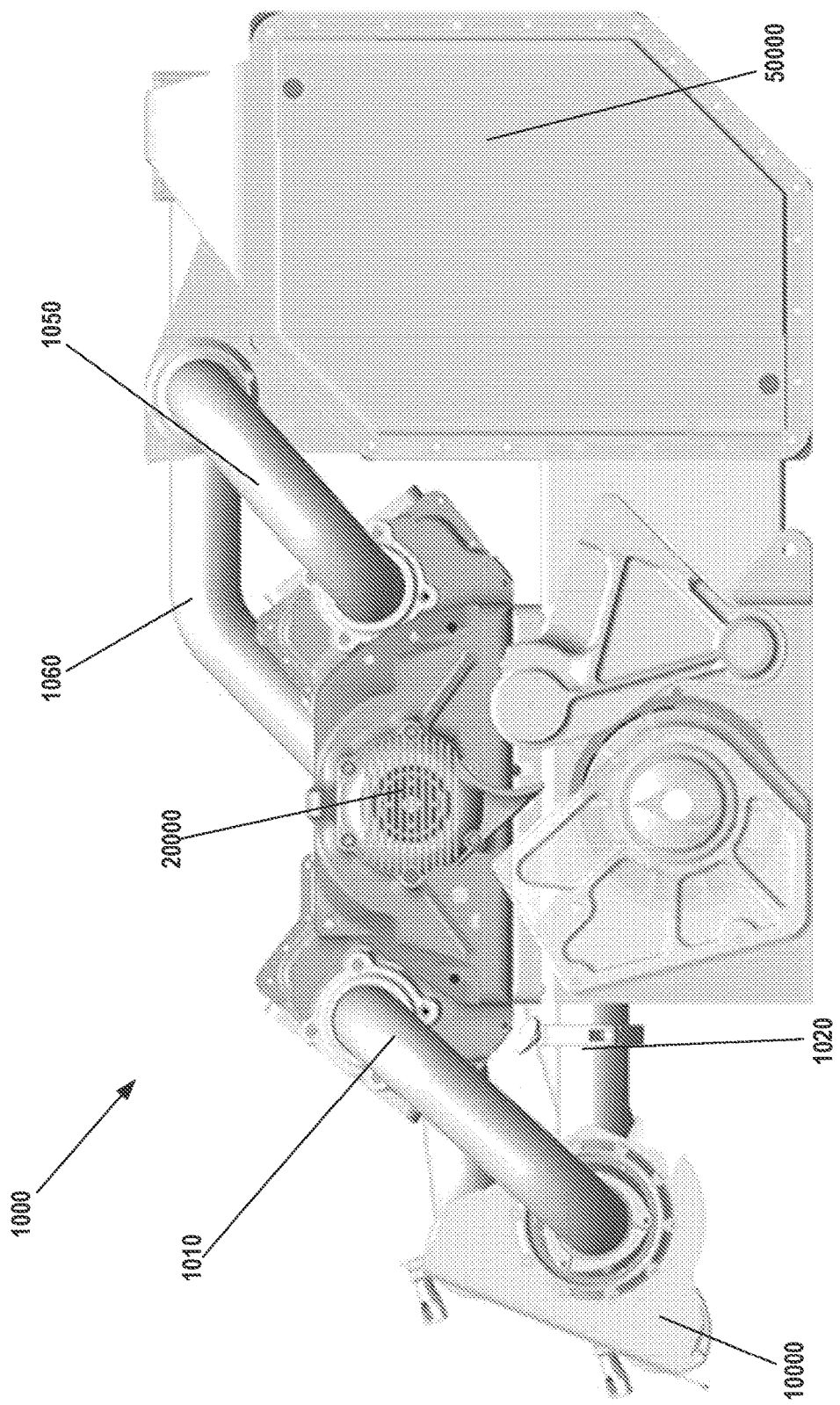
FIG. 6 is a right facing view of a liquid purification system according to an embodiment.
Figure 7:
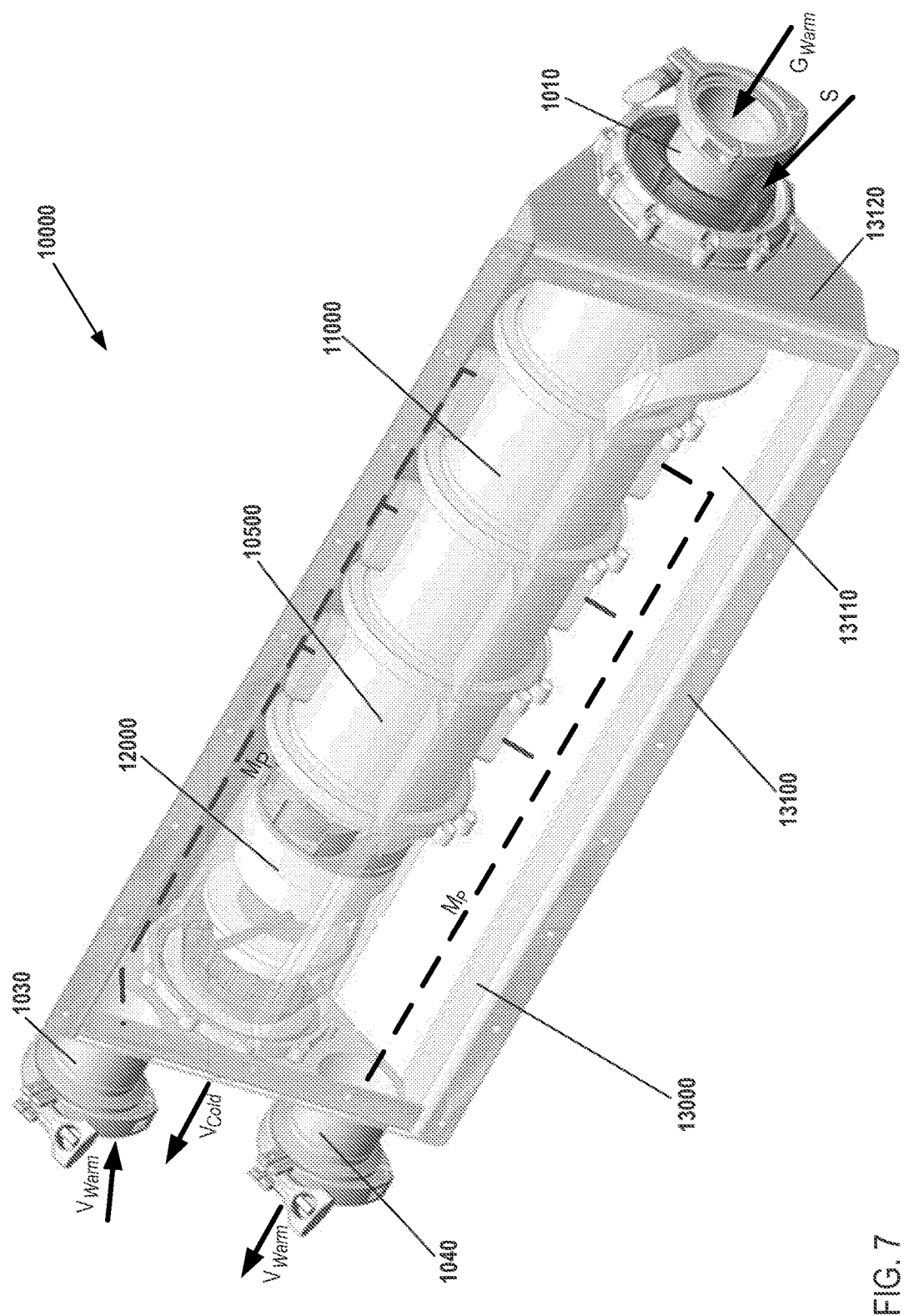
FIG. 7 is a perspective view of an evaporation subsystem according to an embodiment.
Figure 8:
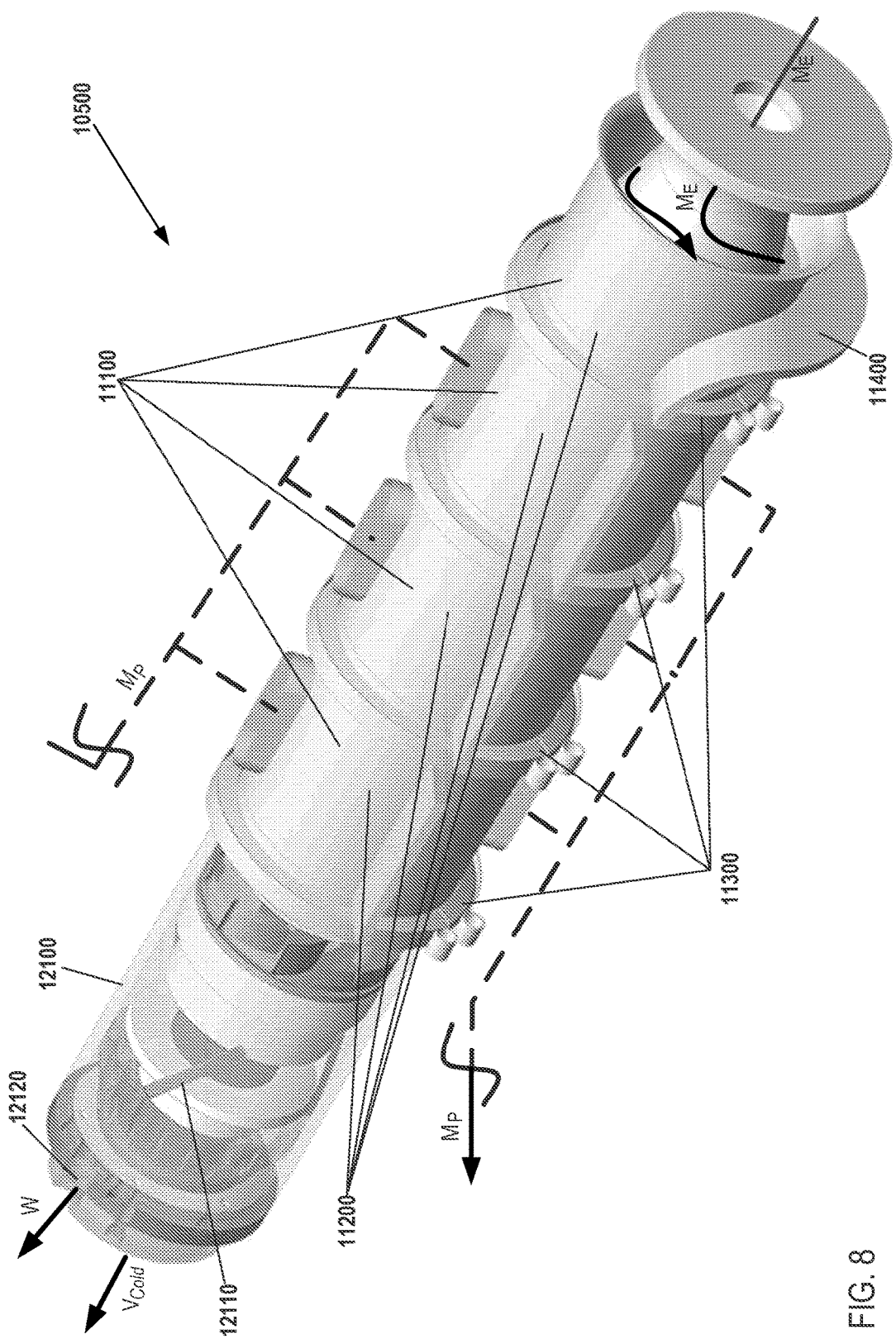
FIG. 8 is a perspective view of an evaporation core of FIG. 7.
Figure 9:
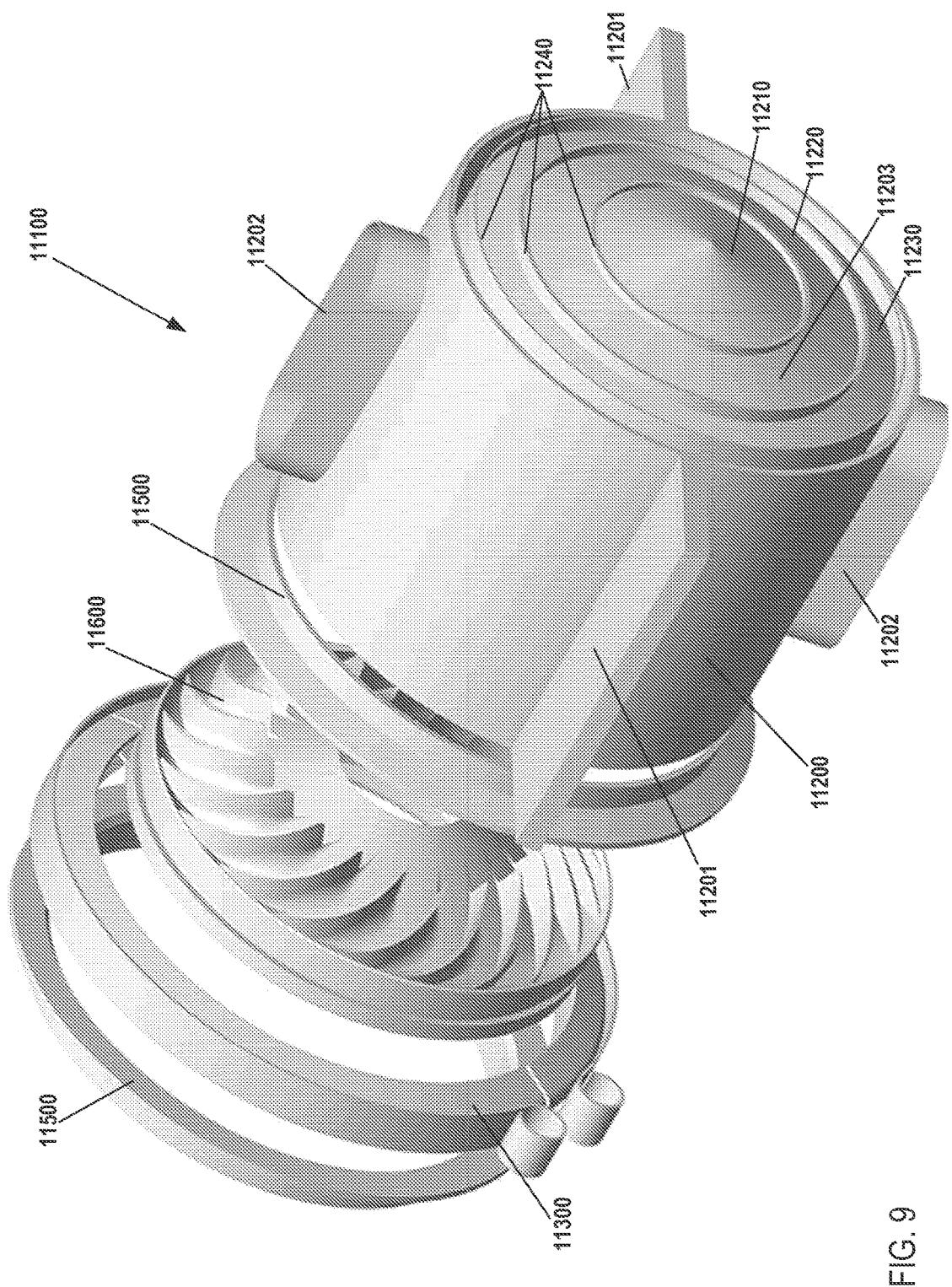
FIG. 9 is an exploded perspective view of a processor pod included in the evaporation subsystem of FIG. 7.
Figure 18:
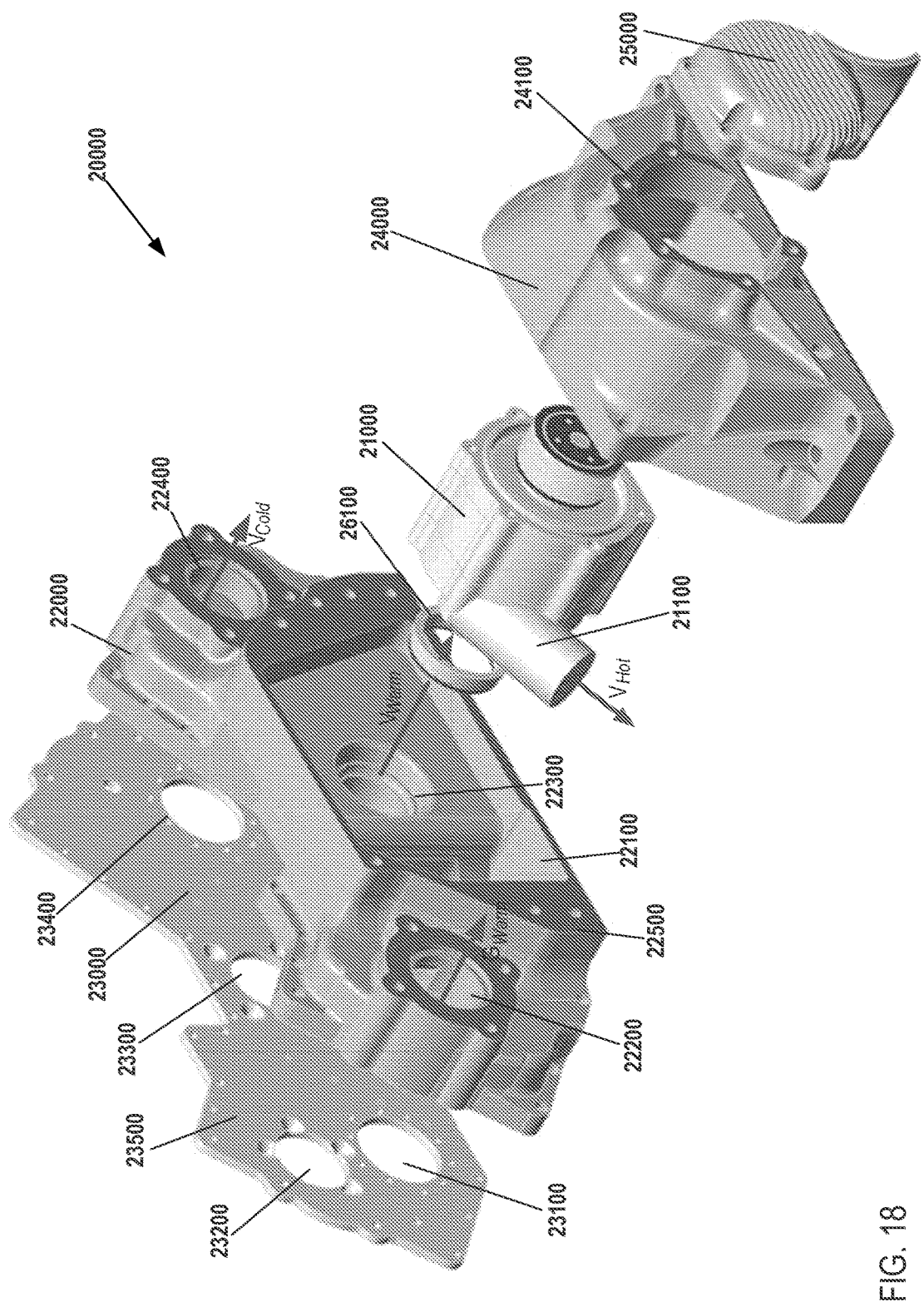
FIGS. 18 and 19 are exploded perspective views of an airflow subsystem included in the liquid purification system of FIG. 4.

FIGS. 4-25 illustrate a liquid purification system 1000 according to an embodiment. As described in more detail herein, the system 1000 is configured to receive feed liquid containing one or more impurities (e.g., inorganic salts, trace metals, dissolved gases) and produce a product liquid substantially free of said impurities. The system 1000 (see e.g., FIGS. 4-6) includes an evaporation subsystem 10000 (see e.g., FIGS. 7-17), an airflow subsystem 20000 (see e.g., FIGS. 18 and 19), a pair of heat exchanger subsystems 30000 and 40000 (see e.g., FIGS. 20-22), and a condenser subsystem 50000 (see e.g., FIGS. 23-25). FIGS. 4-6 are various views of the system 1000. The aforementioned subsystems are thermodynamically and materially connected (e.g., fluidically) by a series of ducts and/or pipes, which collectively define one or more flow pathways. More specifically, the system 1000 includes an evaporation core inlet pipe 1010 that connects an outlet of the heat exchanger subsystem 30000 (also referred to herein as a "first heat exchanger") to an inlet of an evaporation core of the evaporation subsystem 10000; an evaporation core outlet pipe 1020 that connects an outlet of an evaporation core of the evaporation subsystem 10000 to an inlet of the heat exchange subsystem 40000 (also referred to herein as a "second heat exchanger"); an evaporation plenum inlet pipe 1030 that connects an outlet of the first heat exchanger 30000 to an inlet of an evaporation plenum of the evaporation subsystem 10000; an evaporation plenum outlet pipe 1040 that connects an outlet of the evaporation plenum of the evaporation subsystem 10000 to an inlet of the second heat exchanger 40000; a condenser inlet pipe 1050 that connects an outlet of the second heat exchanger 40000 to an inlet of the condenser subsystem 50000; and a condenser outlet pipe 1060 that connects an outlet of the condenser subsystem 50000 to an inlet of the first heat exchanger 30000. Thus, a flow of a material (e.g., dry air, dry argon, water vapor, etc.) can flow within the defined flow path between the components and/or subsystems included in the system 1000, as described herein.

FIGS. 7-17 illustrate the evaporation subsystem 10000 according to an embodiment. The evaporation subsystem 10000 includes an evaporation plenum 13000 (see e.g., FIG. 7), and an evaporation core 10500, which is contains a processor section 11000 (see e.g., FIGS. 8-15) and a separator section 12000 (see e.g., FIGS. 16 and 17). As mentioned previously, the evaporation core 10500 is materially and/or fluidically isolated from the evaporation plenum 1300. As described above, the evaporation core 10500 is connected to the system 1000 via an evaporation core inlet pipe 1010 and an evaporation core outlet pipe 1020. Similarly, the evaporation plenum 13000 is connected to the system 1000 via an evaporation plenum inlet pipe 1030 and an evaporation plenum outlet pipe 1040.

As described in more detail below, the evaporation plenum 13000 is a volume defined by an internal surface 13110 of an evaporation casing 13100 and an outer surface of the evaporation core 10500. The internal surface 13100 of the evaporation plenum 13000 is materially and thermodynamically connected to both the heat exchanger subsystems 30000 and 40000 while the external surface 13120 of the evaporation casing 13100 is exposed to the surroundings. To prevent material and/or thermal loss to the surroundings, the evaporation casing 13100 can be made of non-reactive, insulating, and/or inert materials. Additionally, the evaporation plenum inlet pipe 1030 and evaporation plenum outlet pipe 1040 are fitted with compression seals to prevent leakage (not shown in FIG. 7). The evaporation plenum 13000 allows for warm vapor $V_{Warm}$ to flow from the first heat exchanger subsystem 30000, to warm the evaporation mixture $M_E$, and to exit the evaporation plenum 13000 bound for the second heat exchanger subsystem 40000. The warming vapor flowing through evaporation plenum is defined as the evaporation plenum mixture $M_P$ (see e.g., FIG. 7).

FIGS. 8-17 illustrate the evaporation core 10500 of the evaporation subsystem 10000. The evaporation core 10500 receives inlet gas $G_{Warm}$ and feed liquid S, forms an evaporation mixture $M_E$, and produces either cold vapor $V_{Cold}$ substantially free of impurities or as a concentrated feed liquid highly saturated with impurities or liquid waste W. As mentioned previously, the evaporation core 10500 contains both a processor section 11000 made up of a series of processor pods 11100 (see e.g., FIGS. 9-15) and a separator section 12000 (see e.g., FIGS. 16 and 17). As described above, the system 1000 can be configured to function with one or more processor pods 11100; thus, the discussion herein of one processor pod 11100 is meant to apply to all processor pods 11100 in the system 1000.

Figure 13:
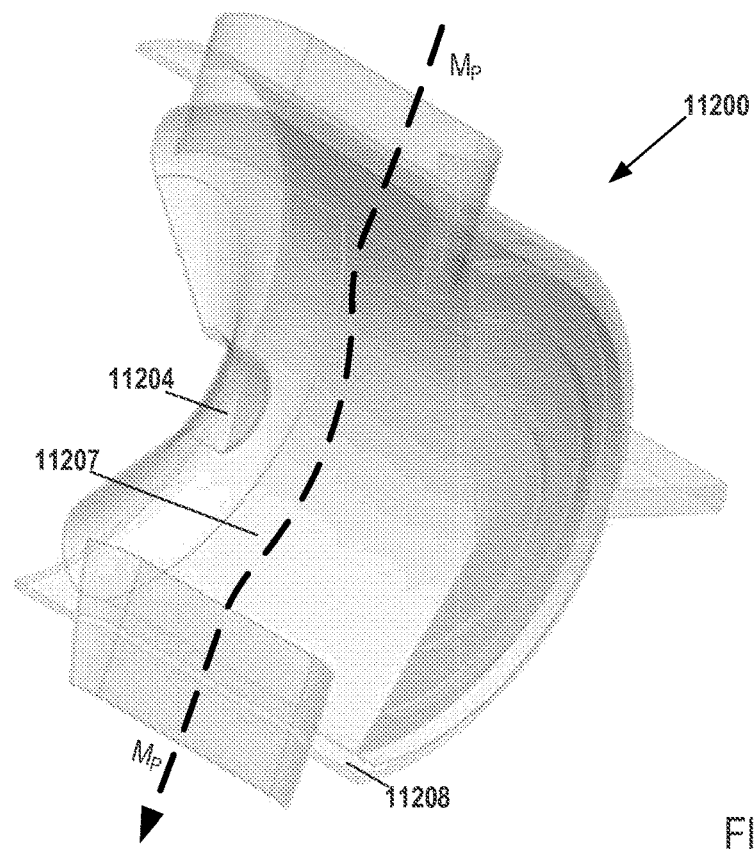
FIG. 13 is a cross-sectional perspective view of the processor chamber of FIG. 12.
Figure 14:
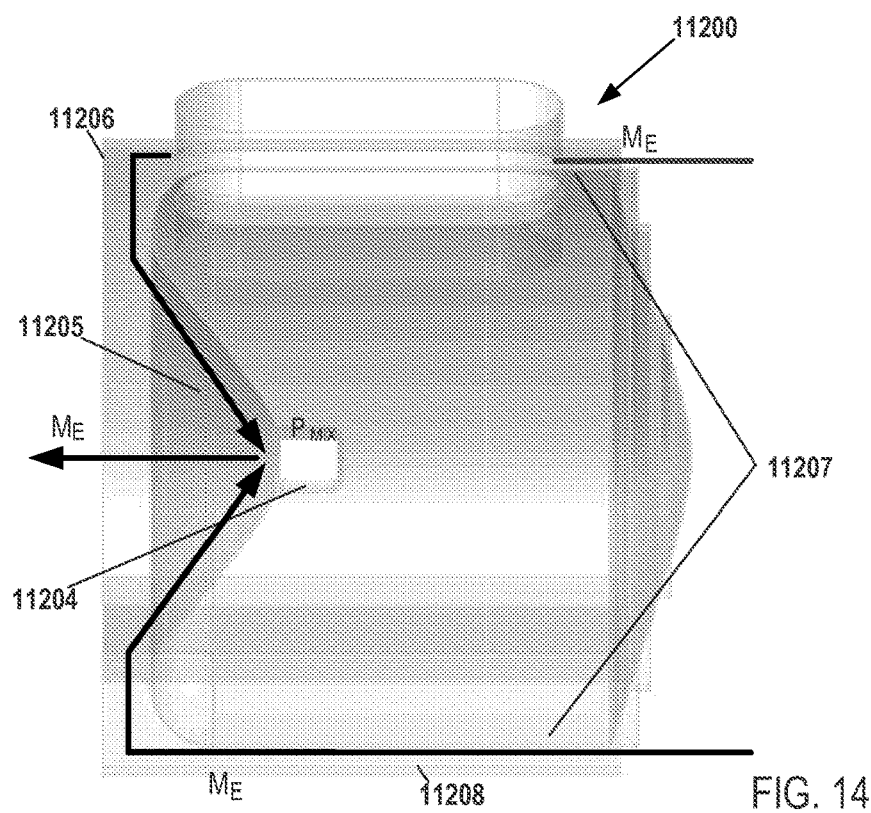
FIG. 14 is a cross-sectional front facing view of the processor chamber of FIG. 12.
Figure 15:
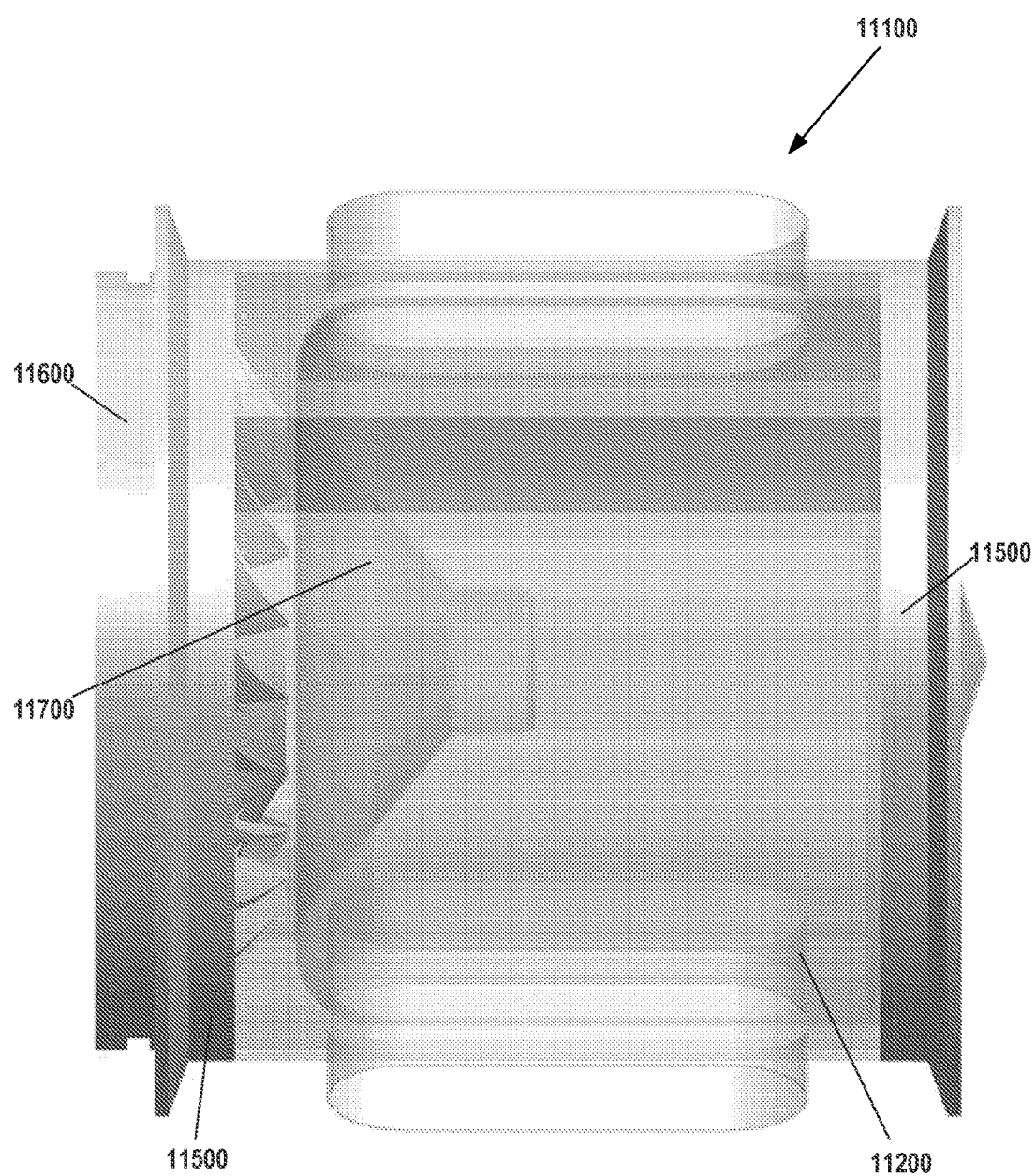
FIG. 15 is a front facing view of the processor pod of FIG. 12.
Figure 16:
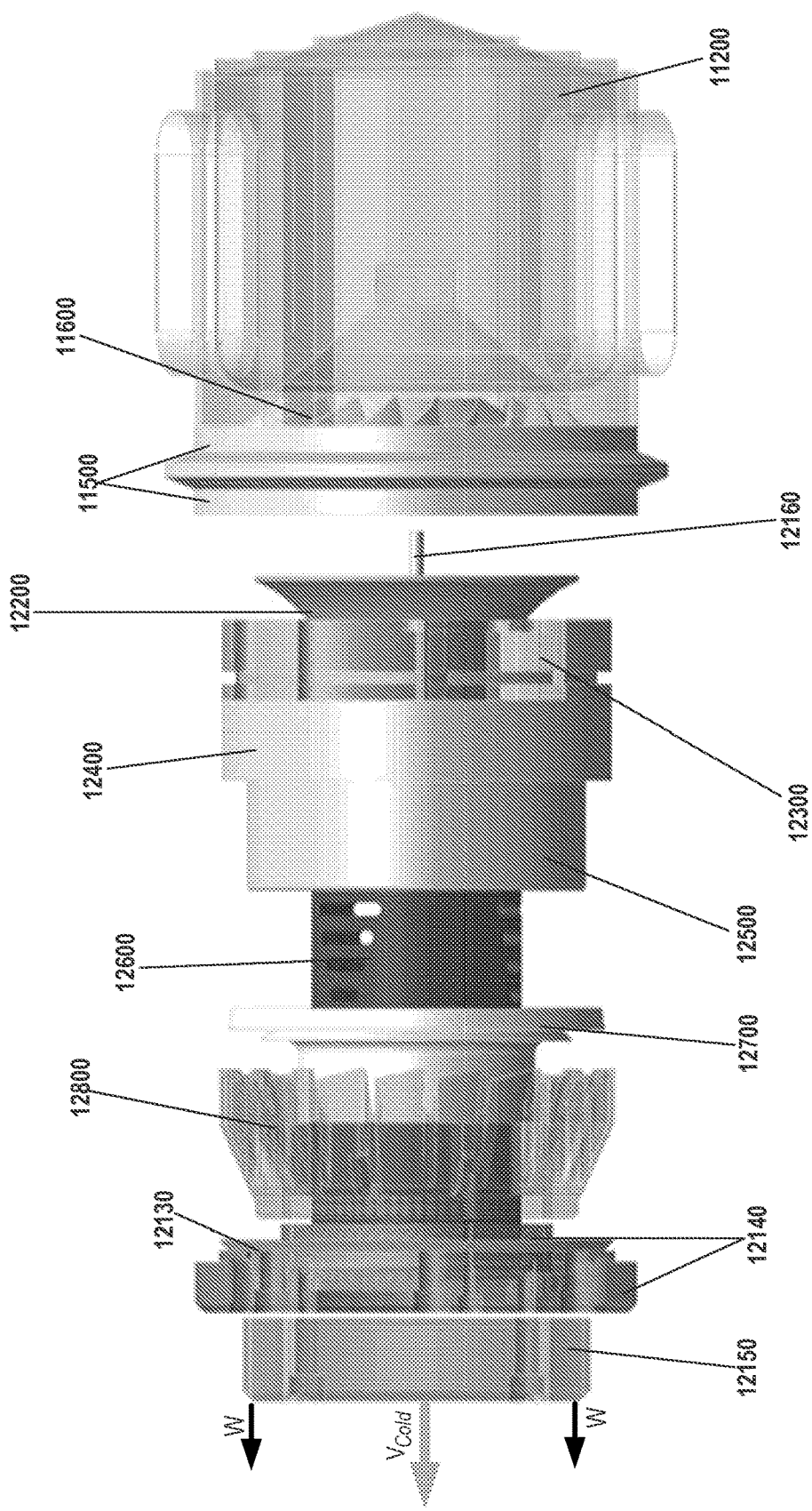
FIG. 16 is a front facing view of a portion of the evaporation subsystem of FIG. 7.
Figure 17:
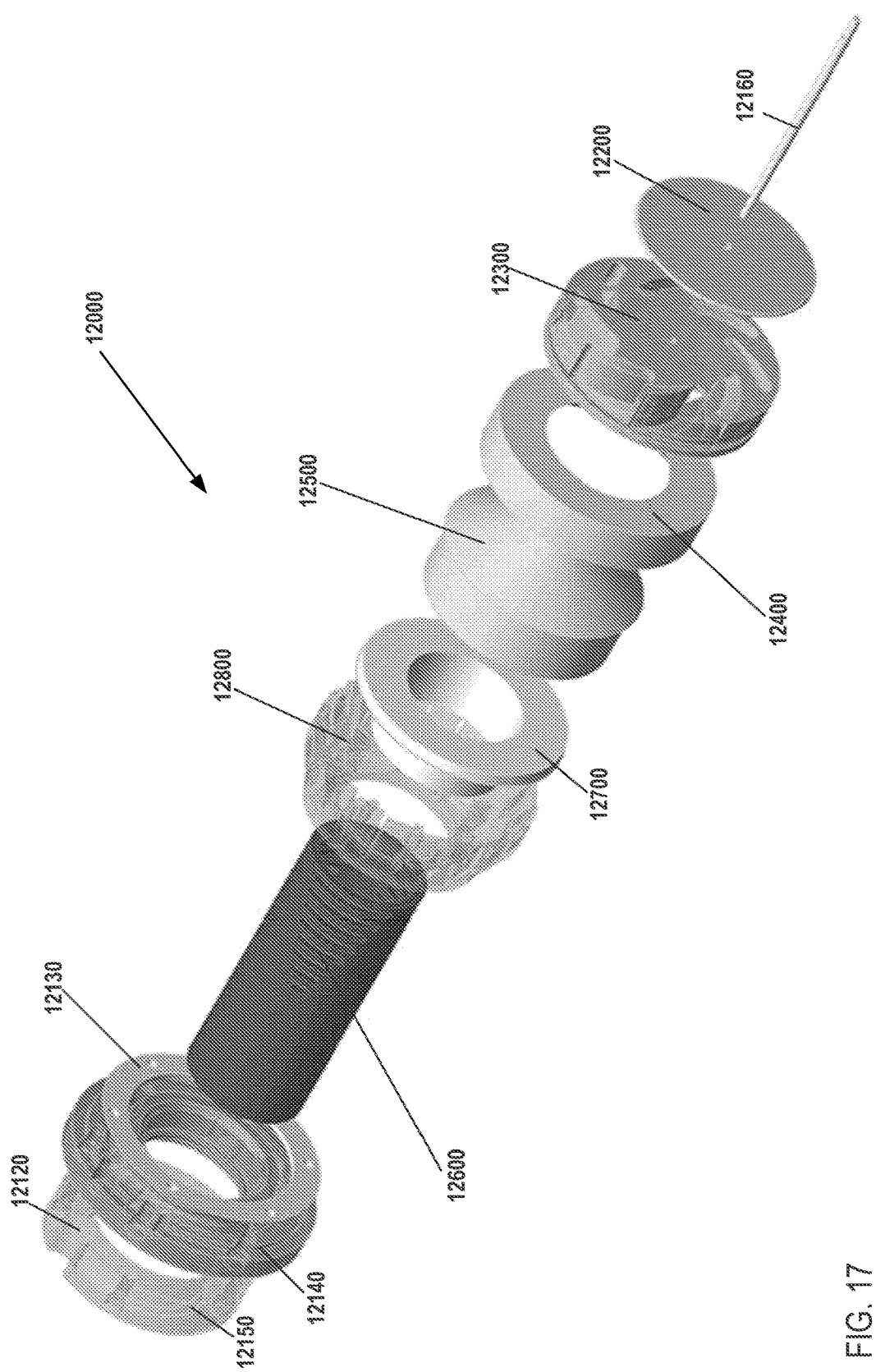
FIG. 17 is an exploded perspective view of at least a portion of a separator included in the evaporation subsystem of FIG. 7.

The processor pod 11100 includes a nozzle 11600, having a first surface 11601 and a second surface 11604, and a processor chamber 11200, having a first surface 11206, a second surface 11207, and a third surface 11208 (see e.g., FIG. 13). In addition, a set of band clamps 11500 secure the nozzle 11600 between two adjacent processor chambers 11200 and is sealed with a clamp 11300 to ensure a materially, fluidically, and/or thermodynamically isolated core. In some embodiments, the initial pod 11100 (e.g., a first processor pod in a series of processor pods) has a modified processor fin 11400 to aid in directing the flow of the evaporation plenum mixture $M_P$ towards the evaporation plenum outlet pipe 1040.

Figure 10:
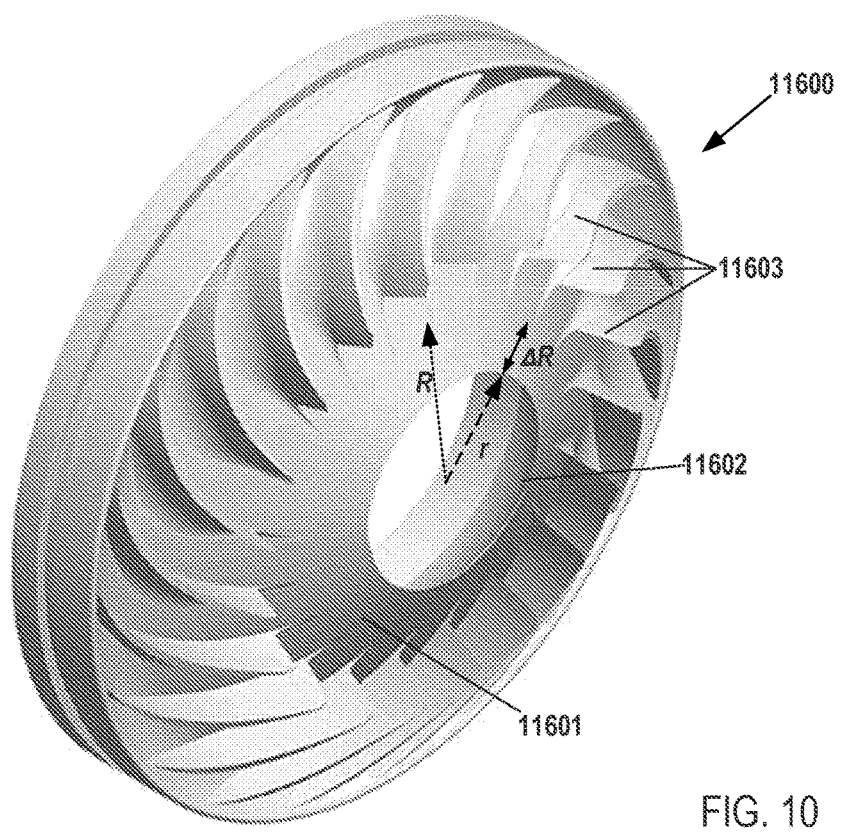
FIG. 10 is a front facing perspective view of a nozzle included in the processor pod of FIG. 9.
Figure 11:
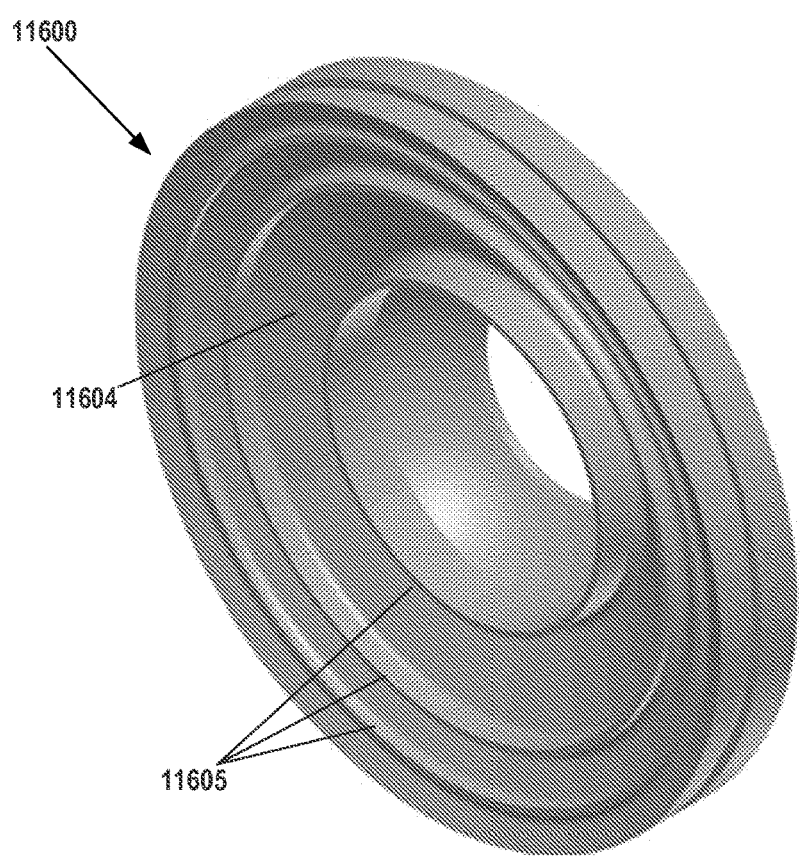
FIG. 11 is a rear facing perspective view of the nozzle of FIG. 10.
Figure 12:
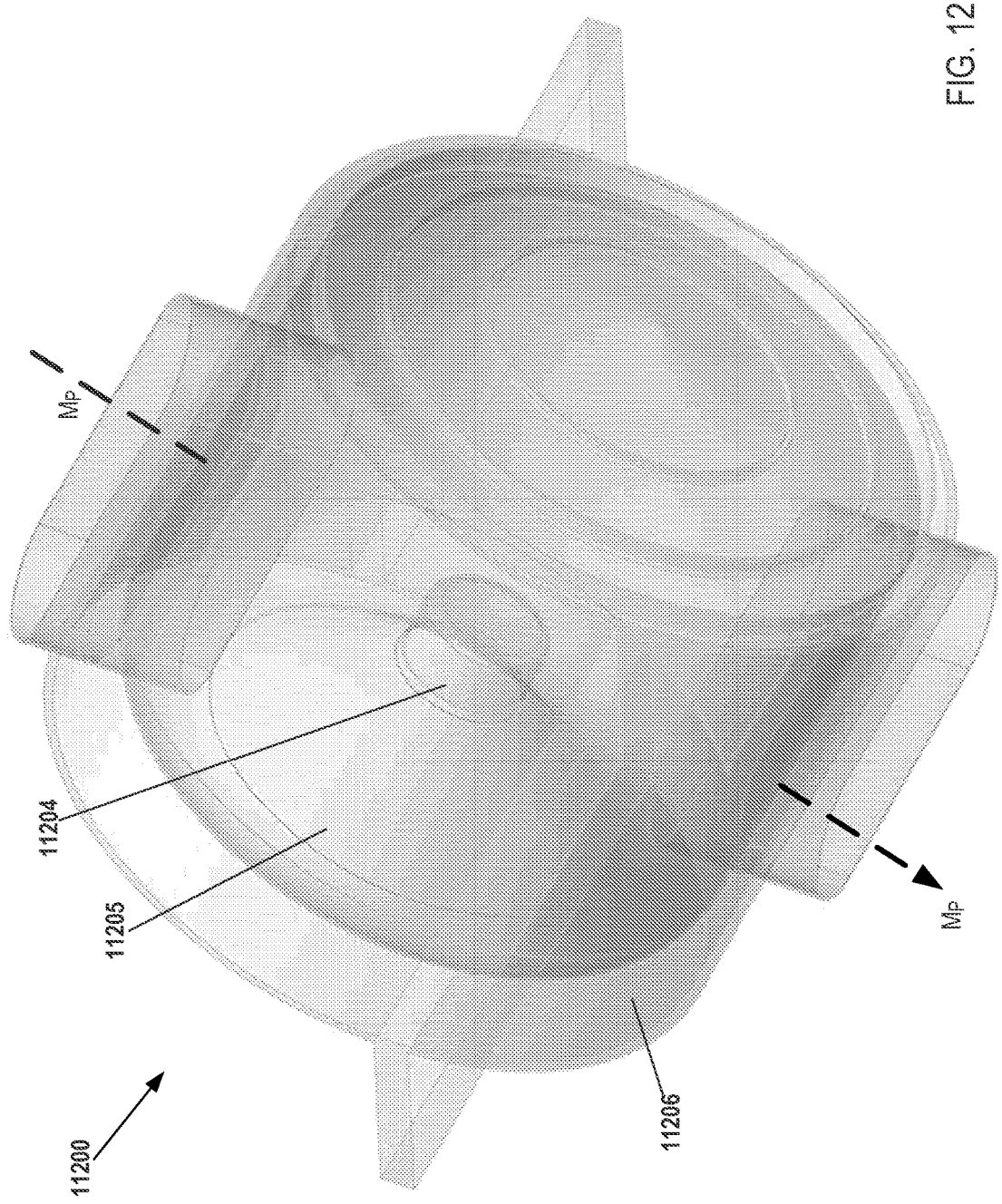
FIG. 12 is a perspective view of a processor chamber included in the processor pod of FIG. 9.

As shown in FIGS. 10 and 11, the nozzle 11600 has a variety of structural features to increase vapor formation—bound for the rest of the system—and to promote super saturation of feed liquid—to produce highly concentrated waste—thereby, minimizing the loss of potential products.

More specifically, the first surface 11601 of the nozzle 11600 includes a set of vanes 11603, which radiate uniformly around the nozzle opening 11602. In other embodiments, a nozzle can include a set of vanes that are not uniformly arranged. The vanes 11603 can be bent to the right to facilitate a counter clockwise flow of the evaporation mixture $M_E$ (see e.g., FIG. 10). Furthermore, the vanes 11603 taper towards the nozzle opening 11602 driving the evaporation mixture $M_E$ inward and promote the formation of the pocket mixture $P_{Mix}$ in a processor pocket 11204 or mixing volume to better direct the vapors and/or liquids into the adjacent processor pod (discussed herein). Additionally the second surface 11604 of the nozzle 11600 has a series of ridges 11605 which reduces friction with the processor pod 11100 as well as aids in the vaporization of the feed liquid S (see e.g., FIG. 11). The series of ridges 11605 align with a similar series of ridges 11240 on the processor pod and prevents nozzle-chamber misalignment. As shown in FIG. 10, a nozzle opening radius r, a funnel radius R, and a vane-tip-to-nozzle-opening length ΔR all affect a flow of the evaporation mixture $M_E$. For example, in some embodiments, the nozzle opening radius r and funnel radius R equal the radii of the cylindrical pocket and the funnel of the processor pod, respectively, which in turn, can increase, facilitate, and/or otherwise enhance a flow of the evaporation mixture $M_E$. Similarly, the vane-tip-to-nozzle-opening length ΔR can affect the vaporization efficacy. For example, a small vane-tip-to-nozzle-opening length ΔR may limit and/or substantially prevent vaporization while a large vane-tip-to-nozzle-opening length ΔR may limit and/or substantially prevent the evaporation mixture $M_E$ from effectively being redirected into the cylindrical pocket (e.g., the processor pocket 11204 or mixing volume) and distributed into the next processor pod.

Referring now to FIGS. 12-14, the processor chamber 11200 can be any suitable device, mechanism, or component that is configured to direct the flow of evaporation mixture $M_E$ through the evaporation core 10500 while facilitating thermal energy exchange between said evaporation mixture $M_E$ and a second flow of fluid such as, for example, an evaporation plenum vapor $M_P$. In this embodiment, the processor chamber 11200 includes various structural features such as processor fins 11201, processor vents 11202, a tapered processor cap 11203, and a processor cylindrical pocket 11204, and processor funnel 11205. Additionally, the processor chamber 11200 has two shells, an outer shell 11206 and an inner shell 11207, to keep material and/or fluidic isolation between the two unique flow paths as well as a gap 1208 between the two shells to allow for thermal energy exchange.

In some embodiments, each of the various structural features of the processor chamber 11200 can improve the function of the flow of the evaporation mixture $M_E$ and the evaporation plenum vapor $M_P$. More specifically, the processor fins 11201 can aid in directing the evaporation plenum vapor $M_P$ and can reduce vapor resistance. Similarly, the processor vents 11202 allow for the continual flow of the evaporation plenum vapor $M_P$, allowing for maximum heat transfer to the evaporation mixture $M_E$ and allowing for increased vaporization of said evaporation mixture $M_E$ while maintaining material and/or fluidic separation between the two flows. As briefly mentioned above, the tapered processor cap 11203 interfaces with the second surface 11604 of the nozzle 11600 to maximize surface contact between the two components. Additionally, the tapered processor cap 11203 is divided into three concentric circles 11210, 11220, and 11230 by a set of raised ridges 11240 (see e.g., FIG. 9). The processor ridges 11240 align with the ridges 11605 on the second surface 11604 of the nozzle 11600 (see e.g., FIG. 11). As mentioned previously, the aligning ridges prevent friction between the components. Additionally, the concentric circles 11210, 11220, and 11230 of the processor cap 11203 aid in improving vaporization of the feed liquid S, as the feed liquid droplets are compressed and/or vaporized to shrink in size and then allowed to expand outward from the center circle 11210 to the outer circle 11230.

FIG. 15 illustrates the alignment of the rear of the processor chamber 11200 with a first surface 11601 of the nozzle 11600. The nozzle 11600 is flush with the cylindrical funnel 11205 to define an evaporation volume 11700. To prevent random flow of the evaporation mixture $M_E$ after it has exited the gap 11208 between the two processor shells 11206 and 11207, the evaporation mixture $M_E$ is directed into the cylindrical pocket 11204 and redirected towards the next nozzle.

FIGS. 16 and 17 illustrate the separator section 12000 of the evaporation core 10500. Although not shown in FIG. 16 or 17 the entire separator section is enclosed by a casing 12100 containing counterclockwise rifling 12110 to aid in vapor flow (see e.g., FIG. 8). The separator section 12000 includes a separator plate 12200, a centrifuge member 12300, a drain member 12400, an outlet flow member 12500, a vapor separator 12600, a vapor barrier 12700, a secondary drain member 12800, a flange 12130, a terminal member 12140, a coupler 12150, and a tie wire 12160. The separator section 12000 receives the evaporation mixture $M_E$ and produces both cold vapor $V_{Cold}$ substantially free of impurities and a feed liquid with a high concentration of impurities or liquid waste W. The process is described in detail herein.

As shown, the separator plate 12200 is situated adjacent to the centrifuge member 11230 and limits the flow of the evaporation mixture $M_E$ into the separator section 13000. The centrifuge member 11230 is situated adjacent to the drain member 12400 and maintains the counterclockwise flow of the evaporation mixture $M_E$. The drain member 12400 also maintains the flow of the evaporation mixture $M_E$ and directs said mixture towards the outlet flow member 12500. The outlet flow member 12500 and the vapor barrier 12700 partially encase the vapor separator 12600. The perforated portion of the vapor separator 12600 allows for the cold vapor $V_{Cold}$ portion of the evaporation mixture $M_E$ to enter the internal track of the separator section and exit the system bound for the second heat exchanger subsystem 40000 exiting through the coupler 12150. The liquid portion of the evaporation mixture $M_E$ is prevented from entering the interior of the vapor separator by the outlet flow member 12500 and the vapor barrier 12700. The liquid portion of the evaporation mixture (e.g., "liquid waste W") is collected by the secondary member 12800 and upon reaching a critical volume (e.g., a predetermined volume or the like), flows from the secondary member 12800 through a set of holes 12120 in the coupler 12150 by the terminal member 12140. The flange 12130 seals the terminal end of the separator section 12000 in the separator casing 12100 (mentioned previously) which was not shown in FIGS. 16 and 17 for clarity.

FIGS. 18 and 19 are exploded views of the airflow subsystem 20000 according to an embodiment. The airflow subsystem 20000 is configured to drive the flow of material through the system 1000. The airflow subsystem 20000 includes an air pump 21000, an adapter 22000, an adapter plate 23000, an air pump housing 24000, and an air pump cover 25000. The air pump 21000 includes an air inlet pipe 21200—which receives warm vapor $V_{Warm}$ from the first heat exchanger subsystem 30000—and an air outlet pipe 21100—which expels hot vapor $V_{Hot}$ bound for the second heat exchanger subsystem 40000. The air pump 21000 can be any suitable fluid machine. For example, the air pump 21000 can be a centrifugal pump or blower that produces a flow of air (e.g., inlet air) having a flow rate of between 30 cubic feet per minute and 3000 cubic feet per minute and a pressure of between 3 p.s.i. and 40 p.s.i. The air pump 21000 can be any suitable pump, such as for example, a Rotex C30-74 supercharger.

The pump housing 24000 includes a cover mounting surface 24100, an engagement surface 24200, and defines an inner volume 24300. The air pump 21000 is at least partially disposed within the inner volume 24300. The engagement surface 24200 is connected to a first surface 22500 of the adapter 22000. More specifically, the pump housing 24000 is connected to the adapter 22000 and forms a substantially airtight seal between the engagement surface 24200 of the pump housing 24000 and the first surface 22500 of the adapter 22000. The pump cover 25000 is mounted to the pump housing 24000 via the cover mounting surface 24100.

The first surface 22500 of adapter 22000 defines an inner volume 22100, a first outlet opening 22200, a return opening 22300, and a second outlet opening 22400. The first outlet opening 22200 is connected to a second outlet of the first heat exchanger 30000. The return opening 22300 is connected with a first outlet of the second heat exchanger 40000. Moreover, the inlet air pipe 21200 is sealed into the return opening 22300 by a seal valve 26100 and a corresponding o-ring 26200. The second outlet opening 22400 is connected to the first outlet of the second heat exchanger 40000.

Figure 19:
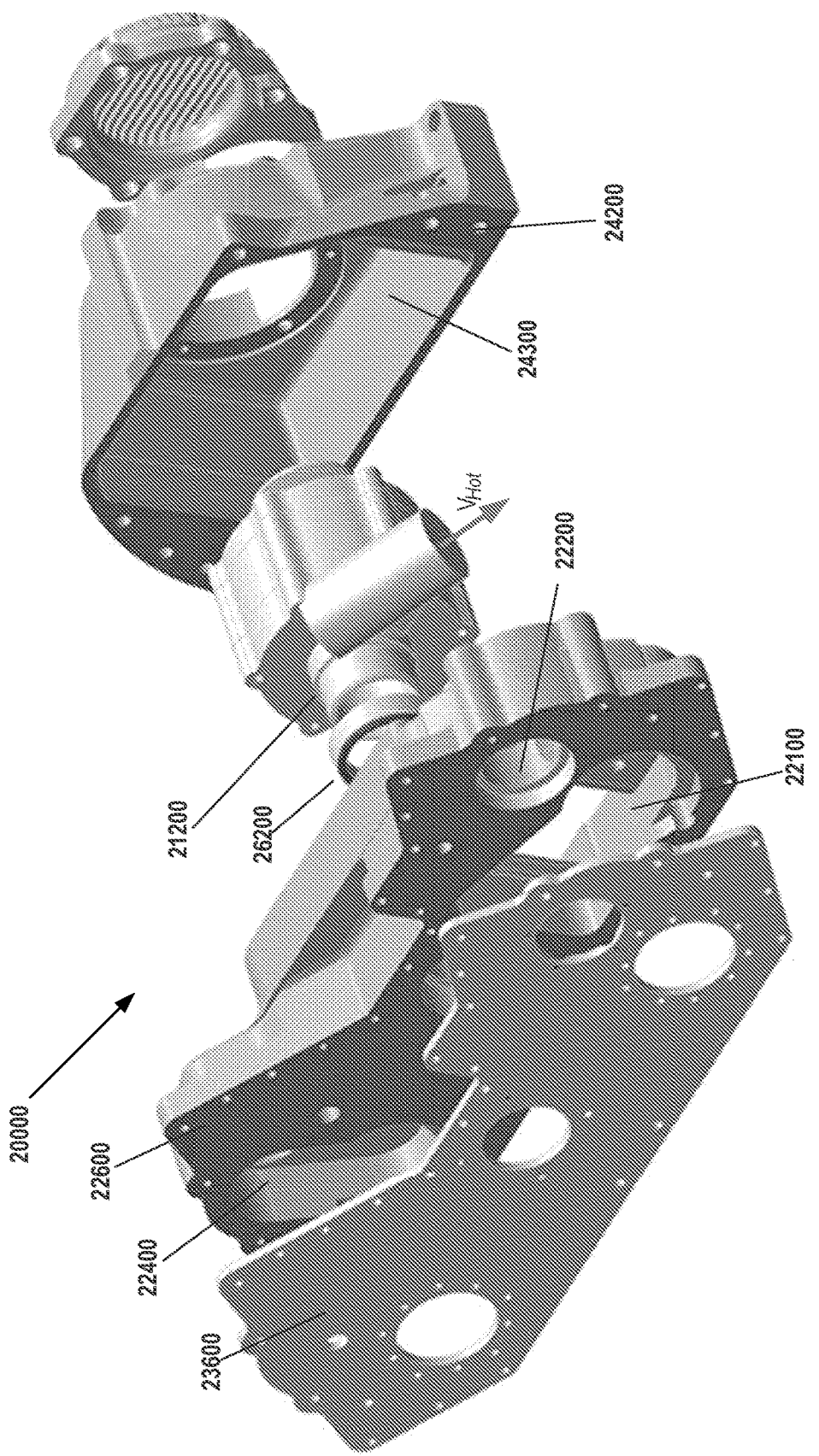

The adapter 22000 includes a second surface 22600 as shown in FIG. 19. The second surface 22600 of the adapter 22000 is coupled with an adapter plate 23000. More specifically, a first surface 23500 of the adapter plate 23000 and the second surface 22600 of the adapter 22000 are coupled to form a substantially airtight seal. The adapter plate 23000 includes an inlet opening 23100, a first outlet opening 23200, a return opening 23300, and second outlet opening 23400. Additionally the second surface 23600 of the adapter plate 23000 is connected to the heat exchanger subsystems 30000 and 40000 as described in more detail herein.

Figure 20:
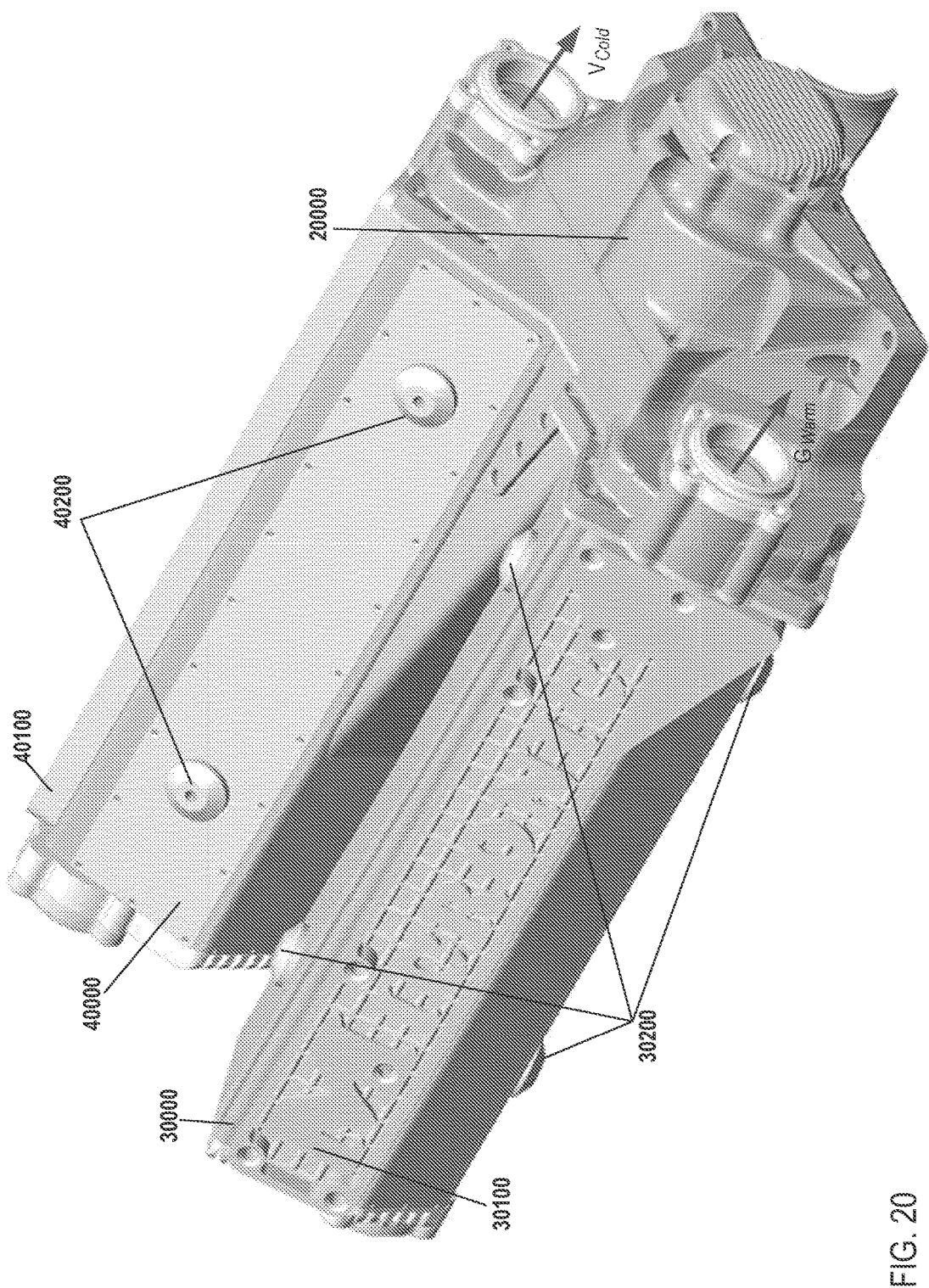
FIG. 20 is a perspective view of the airflow subsystem and a heat exchanger subsystem included in the liquid purification system of FIG. 4.
Figure 21:
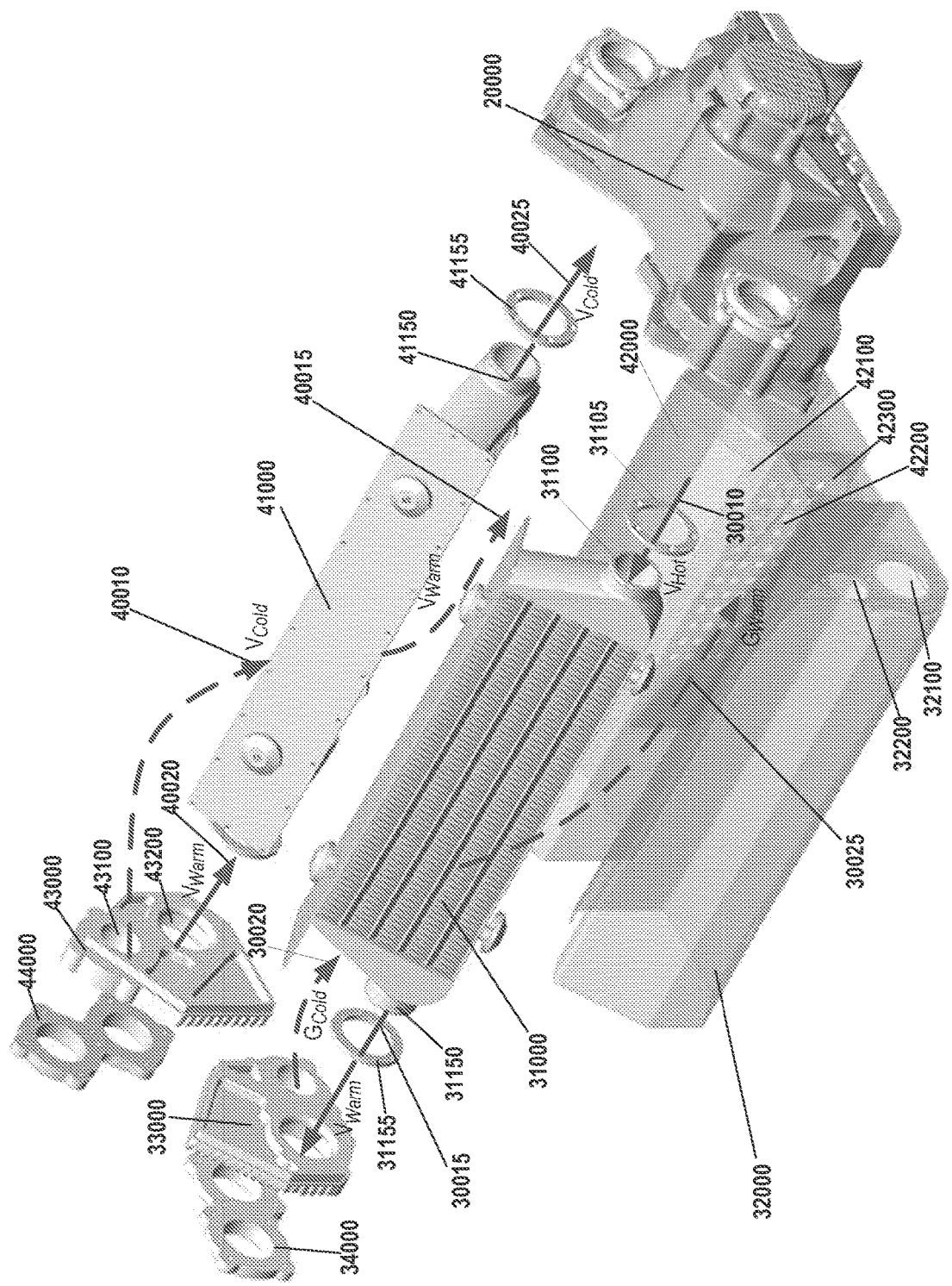
FIGS. 21 and 22 are exploded perspective views of the airflow subsystem and the heat exchanger subsystem of FIG. 20.
Figure 22:
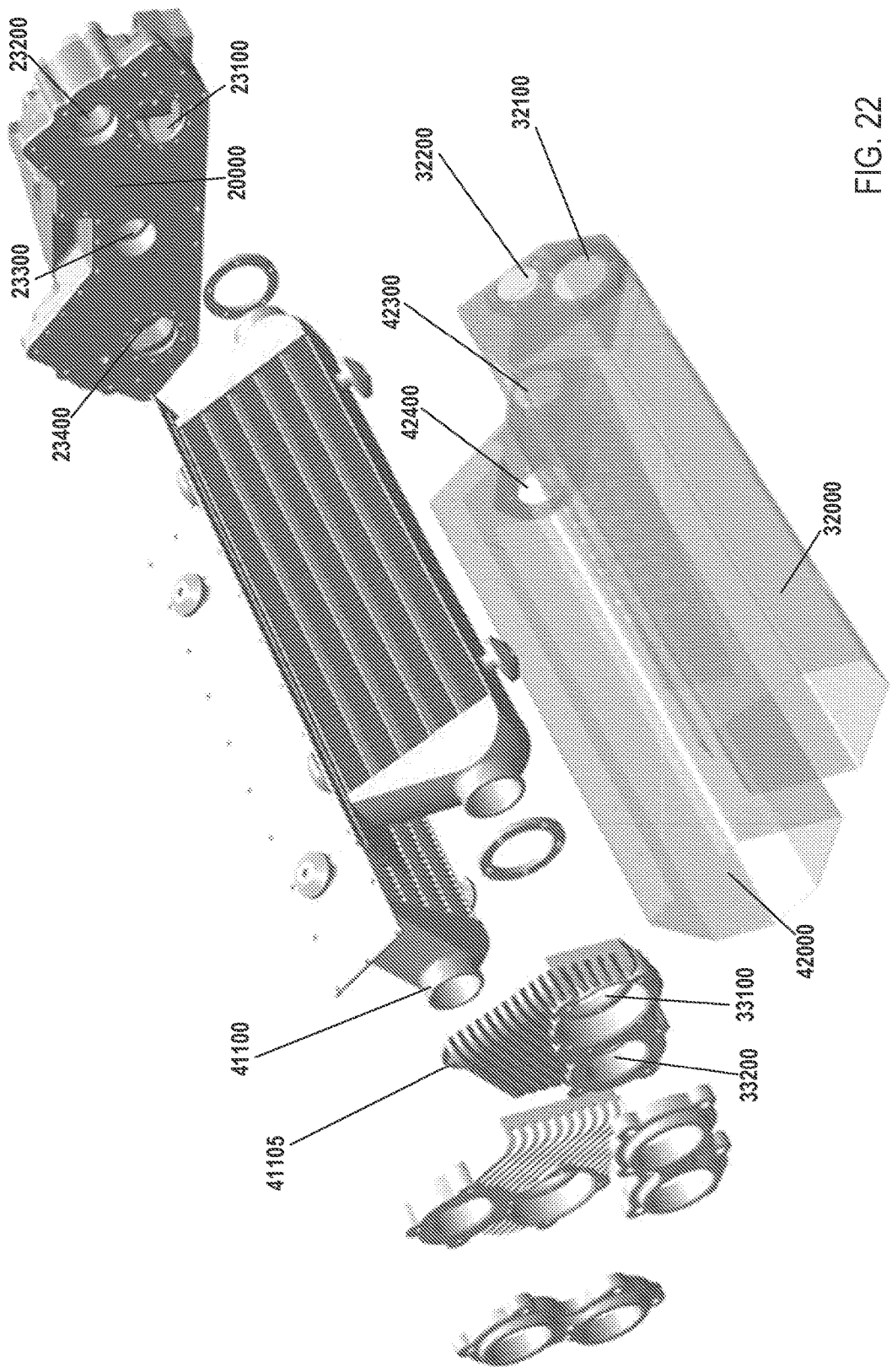

FIGS. 20-22 illustrate the airflow subsystem 20000 and heat exchanger subsystems 30000 and 40000 according to this embodiment. The first heat exchanger subsystem 30000 and the second heat exchanger subsystem 40000 are physically connected to the airflow subsystem 20000 via the second surface 23600 of the adapter plate 23000. As shown in FIGS. 21 and 22, the first heat exchanger 30000 includes a heat exchanger element 31000, a housing 32000, a boss 33000, and a pressure plate 34000. As mentioned previously, the first heat exchanger 30000 includes and/or defines two flow paths fluidically isolated from each other. The first flow path (e.g., the "hot" side) receives an inlet hot vapor $V_{Hot}$ 30010 from the airflow subsystem 20000 and sends an outlet warm vapor $V_{Warm}$ 30015 bound for the evaporation plenum 13000 of the evaporation subsystem 10000. The second flow path (e.g., the "cold" side) receives an inlet cold gas $G_{Cold}$ 30020 from the condenser subsystem 50000 and sends an outlet warm gas $G_{Warm}$ 30025 bound for the evaporation core 10500 of the evaporation subsystem 10000. The housing 32000 of the first heat exchanger 30000 has a first inlet opening 32100 relative to the hot side flow path and a second outlet opening 32200 relative to the to the cold side flow path. The boss 33000 has first outlet opening 33100 relative to the hot side flow path and a second inlet opening 33200 relative to the cold side opening. The heat exchanger element 31000 includes an inlet 31100 that is connected to the first inlet opening 32100 of the housing 32000 via a pressure plate 31105 (see e.g., FIG. 21) and an outlet 31150 that is connected with the first outlet opening 33100 of the boss 33000 via a pressure plate 31155 (see e.g., FIGS. 21 and 22).

The second heat exchanger 40000 includes a heat exchanger element 41000, a housing 42000, a boss 43000 and corresponding pressure plate 44000. As mentioned previously, the first flow path (e.g., the "cold" side) receives an inlet cold vapor $V_{Cold}$ 40010 from the evaporation core 10500 of the evaporation subsystem 10000 and sends an outlet warm vapor $V_{Warm}$ 40015 bound for the airflow subsystem 20000. The second flow path (e.g., the "hot" side) receives an inlet warm vapor $V_{Warm}$ 40020 from the evaporation plenum 13000 of the evaporation subsystem 10000 and sends an outlet cold vapor $V_{Cold}$ 40025 bound for the condenser subsystem 50000. The housing 42000 has a two portions: a first portion 42100 with the first outlet opening 42300 relative to the cold side flow path, and a second portion 42200 with the second outlet opening 42400 relative to the to the hot side flow path. The boss 43000 has the first inlet opening 43100 relative to the cold side flow path and a second inlet opening 43200 relative to the hot side flow path. The heat exchanger element 41000 includes an inlet 41100 that is connected to the first inlet opening 43100 of the boss 43000 via a pressure plate 41105 (see e.g., FIGS. 21 and 22) and an outlet 41150 that is connected with the first outlet opening 43100 of the first portion 42100 of the housing 42000 via a pressure plate 41155 (see e.g., FIG. 21). Both housings can be fitted with nameplates 30100 and 40100 and riveted in place with rivets 30200 and 40200.

Figure 23:
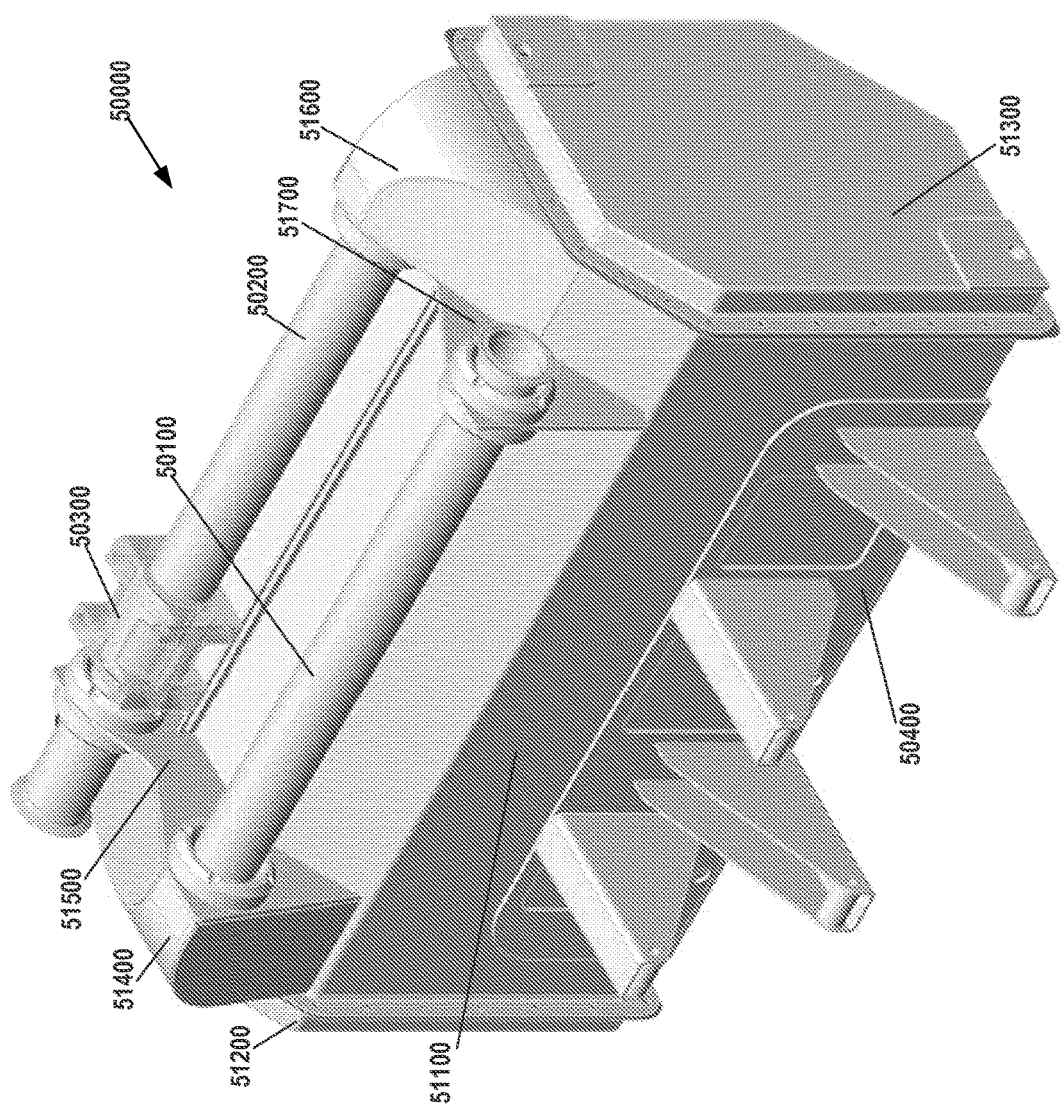
FIG. 23 is a perspective view of a condenser subsystem included in the liquid purification system of FIG. 4.
Figure 24:
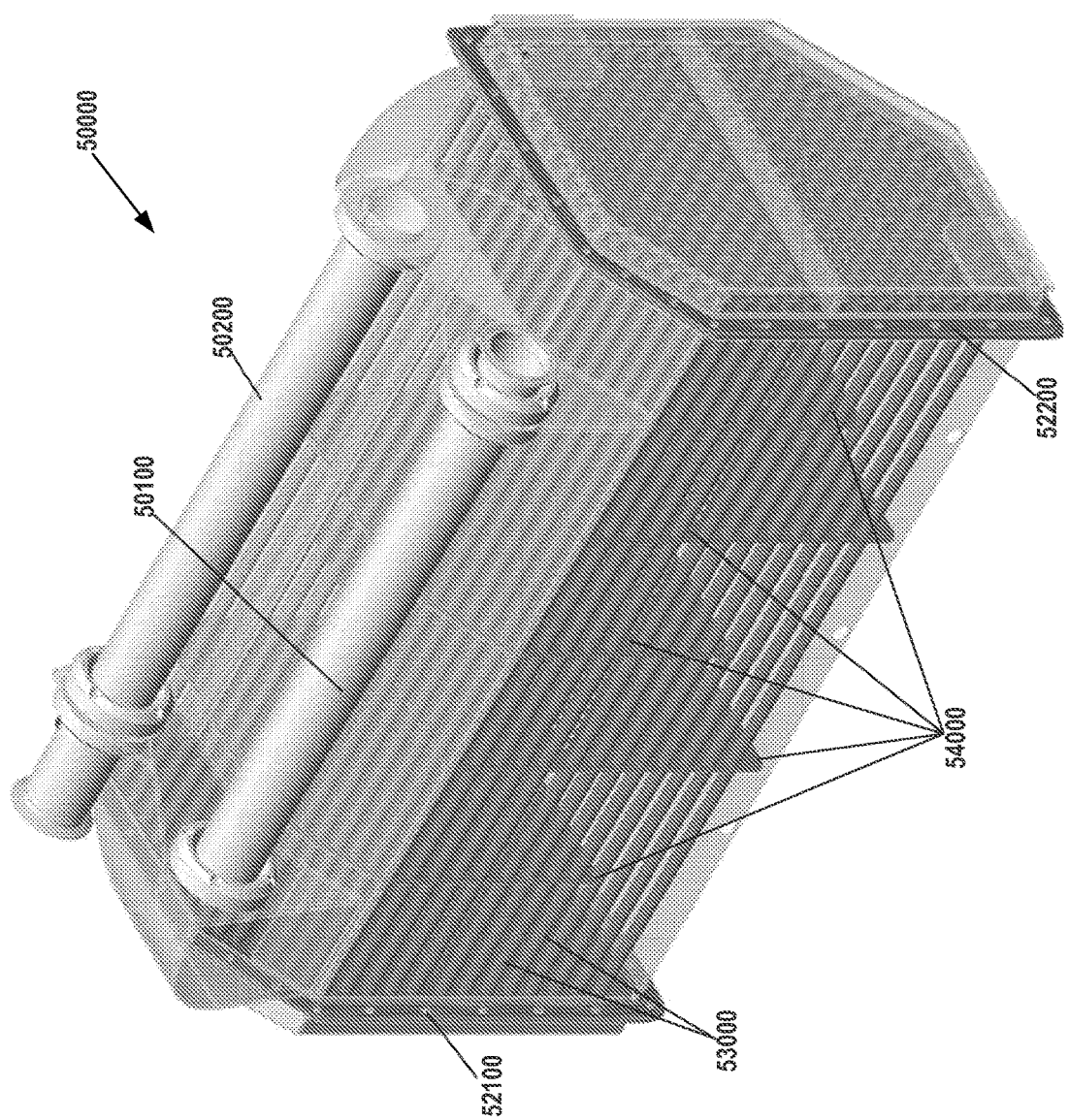
FIGS. 24 and 25 are perspective views of portions of the condenser subsystem of FIG. 23 showing internal components thereof.
Figure 25:
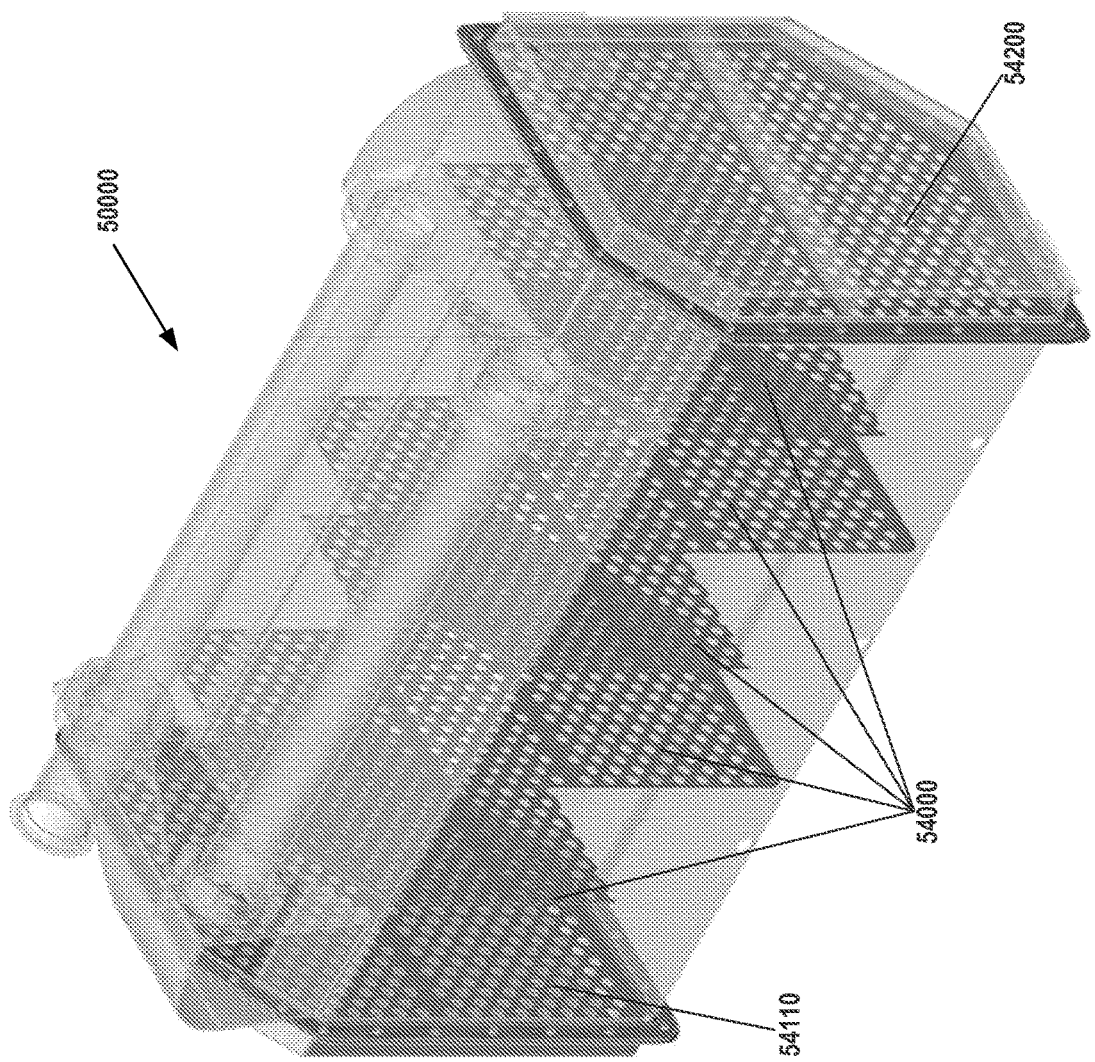

FIGS. 23-25 illustrate the condenser subsystem 50000. As mentioned previously, the condenser subsystem 50000 is connected to the second heat exchanger 40000 via the condenser inlet pipe 50100, which allows the inflow of cold vapor $V_{Cold}$. Analogously, the condenser subsystem 50000 is connected to the first heat exchanger 30000 via the condenser outlet pipe 50200, which allows the outflow of $G_{Cold}$. The condenser subsystem 50000 includes a housing 51100, two interior shells 52100 and 52200, an array of condenser pipes 53000, and a series of staggered baffles 54000 including two terminal baffles 54110 and 54200. In some embodiments, a probe/device connector panel 50300 can be mounted to the condenser outlet pipe 50200 to monitor the system. The condenser subsystem 50000 is mounted to the second heat exchanger 40000 via a mounting bracket 50400.

The housing 51100 of the condenser subsystem 50000 includes initiator side housing 51200, the terminal side housing 51300, an inlet pipe support bracket 51400, an inlet pipe casing 51500, an outlet pipe support bracket 51600, and the outlet pipe casing 51700. The array of condenser pipes 53000 can be any conductive material that causes the liquefaction of the condenser mixture $M_C$ as it flows through the condenser subsystem 50000.

As described above, the vaporized portion of the solution is separated from the liquid portion of the solvent and the solute of the solution. In some embodiments, the vaporized portion of the solution can flow within a portion of the water purification system 1000 to the condenser subsystem 50000. In such embodiments, the condenser subsystem 50000 can condense at least a portion of the vaporized portion of the solution to produce a flow of substantially purified liquid (e.g., water). The substantially purified liquid can then be collected for later use. As described above, in some instances, an inlet solution can be conveyed with a total dissolved solids (TDS) concentration of greater than 30,000 parts per million (PPM). In such instances, the substantially purified outflow can have a TDS concentration of less than 500 PPM. In some instances, an inlet solution can be conveyed with a fungal concentration of greater than 100 colony-forming units (CFUs) per milliliter. In such instances, the substantially purified outflow can have substantially no fungal growth. In some instances, an inlet solution can be conveyed with a bacterial concentration of greater than 900 CFUs per milliliter. In such instances, the substantially purified outflow can have a bacterial concentration of less than 50 CFUs per milliliter.

As described above, the systems and methods for water purification described herein can include the removal of organisms. The methods described below can be used in conjunction with any suitable system that mixes a solution with a gas to form an atomized mixture, and then separates the vaporized portion of the mixture, including the systems 1000, 2000, 3000, 4000, 5000, 6000, 7000, and 8000 described herein as well as the systems shown in U.S. Pat. No. 9,044,692, entitled, "Systems and Methods for Water Desalinization," filed Aug. 25, 2011, the disclosure of which is incorporated herein by reference in its entirety. In some embodiments, a water-treatment technology includes one or more blowers, processors, and separators to produce an enclosed tornado effect in a compartmented cylindrical pathway that creates micro-droplets of water for rapid evaporation and reliquification.

Methods according to an embodiment can employ any portion or mechanism of any of the embodiments described herein to remove contaminants. In some embodiments, a method includes conveying an inlet solution from a source to an outlet opening of an atomizer via a first flow path, the first flow path defined by a flow member of the atomizer. An inlet gas is conveyed into the first flow path to produce an atomized mixture of the solution and the inlet gas. The inlet gas is conveyed into the first flow path via a second flow path defined by an outer surface of the flow member such that the inlet gas has a rotational velocity component when the inlet gas exits the second flow path. The method further includes separating the mixture of the inlet gas and the solution to produce a first outlet flow and a second outlet flow. The first outlet flow includes a portion of the gas and a vaporized portion of the water from the solution. The second outlet flow includes a portion of the water from the solution and a solute (e.g., the contaminants, organisms, minerals or the like) from the solution.

In addition to desalinization, the systems and methods described herein include removal of industrial wastewater chemicals, bacteria, and fungi. For example, in some embodiments, a method includes conveying inlet water from a source to an outlet opening of an atomizer via a first flow path. The inlet water can include a first concentration of organisms such that the inlet water is unsuitable for consumption. An inlet gas is conveyed into the first flow path to produce an atomized mixture of the inlet water and the inlet gas. The inlet gas is conveyed into the first flow path via a second flow path defined by an outer surface of the flow member such that the inlet gas has a rotational velocity component when the inlet gas exits the second flow path. The method further includes separating the mixture of the inlet gas and the water to produce a first outlet flow and a second outlet flow. The first outlet flow includes a portion of the gas and a vaporized portion of the water from the solution. The first outlet flow can include a second concentration of organisms that is lower than the first concentration of organisms. The second outlet flow includes a portion of the water from the solution and a solute (e.g., the contaminants, organisms, minerals or the like) from the solution.

The inlet gas can be any suitable gas. For example, in some embodiments, the inlet gas can be air (e.g., a standard atmospheric composition). In other embodiments, the inlet gas can include any suitable constituent formulated to improve the performance of the systems and methods disclosed herein. For example, in some embodiments, the inlet gas can include a reactive component formulated to react with one or more contaminants within the inlet solution to improve the performance of the systems and methods described herein. For example, in some embodiments, the inlet gas can include ozone.

While various embodiments have been described above, it should be understood that they have been presented by way of example only, and not limitation, and as such, various changes in form and/or detail may be made. Any portion of the apparatus and/or methods described herein may be combined in any suitable combination, unless explicitly expressed otherwise. Where methods and/or schematics described above indicate certain events and/or flow patterns occurring in certain order, the ordering of certain events and/or flow patterns may be modified. Additionally, certain events may be performed concurrently in parallel processes when possible, as well as performed sequentially. While the embodiments have been particularly shown and described, it will be understood that various changes in form and details may be made.

Although the systems have been described primarily for use as water desalinization, the systems and elements thereof are not limited thereto. In some embodiments, any of the devices and/or components described herein can be used to separate a solute from any solution.

Although various embodiments have been described as having particular features and/or combinations of components, other embodiments are possible having a combination of any features and/or components from any of embodiments as discussed above.

What is claimed is:

1. An apparatus, comprising:

an atomizer configured to mix a solution and a flow of an inlet gas to produce an atomized mixture of the solution and the inlet gas, the atomizer including a first flow member and a second flow member, the first flow member having an outer surface and defining an outlet opening, the outer surface of the first flow member including a vane defining at least a portion of a first flow path, the second flow member having a first surface and a second surface and defining a second flow path therebetween, a portion of the first surface defining a mixing volume, the second flow path configured to convey a flow of the solution and the inlet gas to the mixing volume, at least a portion of the flow being conveyed to the first flow path via the second flow path such that the vane redirects a portion of at least one of a tangential velocity component or a circumferential velocity component of the flow as the solution and the inlet gas flow within the first flow path to produce a rotational velocity component within the flow when the flow is conveyed to the mixing volume, such that the solution and the inlet gas mix within the mixing volume to produce a mixture of the solution and the inlet gas; and a separator configured to be fluidically coupled to an outlet of the atomizer, the separator configured to receive the mixture of the solution and the inlet gas, the separator configured to produce a first outlet flow and a second outlet flow, the first outlet flow including a vaporized portion of a solvent from the solution, the second outlet flow including a liquid portion of the solvent from the solution and a solute from the solution.

2. The apparatus of claim 1, wherein a cross sectional area of the second flow path at a first location along a longitudinal axis of the second flow member is greater than a cross sectional area of the second flow path at a second location along the longitudinal axis, the first location being further downstream from the mixing volume than the second location.

3. The apparatus of claim 1, wherein the second flow member defines a processor chamber,
wherein the first flow member defines an injector nozzle configured to produce a spray of the solution into the processor chamber, the injector defining an injector mixing volume within which the solution and the inlet gas are at least partially mixed.

4. The apparatus of claim 1, wherein the vane of the first flow member is from a plurality of vanes, the plurality of vanes being circumferentially arranged along the outer surface of the first flow member, each vane from the plurality of vanes being spaced apart from an adjacent vane from the plurality of vanes.

5. The apparatus of claim 4, wherein the vane is a first vane from the plurality of vanes, a space between the first vane from the plurality of vanes and a second vane from the plurality of vanes adjacent to the first vane defining a portion of the first flow path.

6. The apparatus of claim 1, wherein the vane of the first flow member is from a plurality of vanes, each vane from the plurality of vanes having a substantially curvilinear shape.

7. The apparatus of claim 1, wherein the first flow member and the second flow member are coupled together via at least one clamp.

8. The apparatus of claim 1, wherein the separator includes a separator member disposed within a housing, the separator member defining a central opening and a waste opening offset from the central opening, the separator member having an outer surface defining a perforated portion configured to direct the first outlet flow towards the central opening and the second outlet flow towards the waste opening.

9. The apparatus of claim 1, wherein the atomizer and the separator collectively form a portion of an evaporation subsystem, the evaporation subsystem including an evaporation plenum, the atomizer and the separator being disposed in the evaporation plenum, the evaporation plenum configured to receive a flow of a plenum mixture, the plenum mixture including a volume of the solution and a volume of the inlet gas, the flow of the plenum mixture within the evaporation plenum configured to transfer thermal energy to the solution and the inlet gas within at least one of the first flow path, the second flow path, or the mixing volume.

10. The apparatus of claim 9, wherein the second flow member defines a set of vents and a set of fins, the set of vents and the set of fins configured to direct a flow of the plenum mixture to increase an amount of thermal energy transferred from the plenum mixture to the solution and the inlet gas within at least one of the first flow path, the second flow path, or the mixing volume.

11. An apparatus, comprising:

an atomizer configured to mix a solution and a flow of an inlet gas to produce an atomized mixture of the solution and the inlet gas, the atomizer including a first flow member and a second flow member, the first flow member having an outer surface and defining an outlet opening, the second flow member having an outer portion and an inner portion at least partially disposed in the outer portion such that an inner surface of the outer portion is spaced apart from an outer surface of the inner portion to define a first flow path therebetween, the inner portion defining a mixing volume in fluid communication with the first flow path, the first flow path configured to convey a flow of the solution and the inlet gas to the mixing volume, at least a portion of the flow being redirected by a plurality of vanes disposed on the outer surface of the first flow member to produce a rotational velocity component within the flow when the flow is conveyed to the mixing volume, such that the solution and the inlet gas mix within the mixing volume to produce a mixture of the solution and the inlet gas; and an evaporation plenum, the atomizer being disposed within the evaporation plenum, the evaporation plenum defining a second flow path configured to receive a flow of a plenum mixture of the solution and the inlet gas, the plenum mixture flowing within the second flow path configured to transfer thermal energy between the plenum mixture and the solution and the inlet gas within at least one of the first flow path or the mixing volume.

12. The apparatus of claim 11, wherein the plenum mixture has a first amount of thermal energy, the mixture of the solution and the inlet gas produced within the mixing volume having a second amount of thermal energy, the first amount of thermal energy being greater than the second amount of thermal energy.

13. The apparatus of claim 11, wherein the inner portion of the second flow member defines an inner volume, the inner volume being fluidically isolated from the first flow path, the inner portion of the second flow member and the outer portion of the second flow member collectively defining a plurality of vents in fluid communication with the inner volume of the inner portion, the plurality of vents and the inner volume of the inner portion of the second flow member defining a portion of the second flow path.

14. The apparatus of claim 13, wherein at least a portion of the plenum mixture flows through the set of vents and the inner volume of the inner portion to increase an amount of thermal energy transferred from the plenum mixture to the solution and the inlet gas within at least one of the first flow path or the mixing volume.

15. The apparatus of claim 11, wherein the outer portion of the second flow member includes a set of fins, the set of fins configured to direct at least a portion of the plenum mixture flowing in the second flow path.

16. The apparatus of claim 11, further comprising:

a separator configured to to receive the mixture of the solution and the inlet gas from the atomizer, the separator configured to produce a first outlet flow and a second outlet flow, the first outlet flow including a vaporized portion of a solvent from the solution, the second outlet flow including a liquid portion of the solvent from the solution and a solute from the solution.

17. The apparatus of claim 11, wherein the second flow member is a processor chamber, the apparatus further comprising:

an injector configured to produce a spray of the solution into the processor chamber, the injector defining a mixing volume within which the solution and the inlet gas are at least partially mixed.

\* \* \* \* \*